(12) United States Patent
Kitahara et al.

(10) Patent No.: US 11,656,402 B2
(45) Date of Patent: *May 23, 2023

(54) OPTICAL FIBER AND LASER DEVICE

(71) Applicant: Fujikura Ltd., Tokyo (JP)

(72) Inventors: Rintaro Kitahara, Chiba (JP); Tatsuya Kishi, Chiba (JP)

(73) Assignee: Fujikura Ltd., Tokyo (JP)

( * ) Notice: Subject to any disclaimer, the term of this patent is extended or adjusted under 35 U.S.C. 154(b) by 250 days.

This patent is subject to a terminal disclaimer.

(21) Appl. No.: 16/958,332

(22) PCT Filed: Dec. 27, 2018

(86) PCT No.: PCT/JP2018/048370
§ 371 (c)(1),
(2) Date: Jun. 26, 2020

(87) PCT Pub. No.: WO2019/131970
PCT Pub. Date: Jul. 4, 2019

(65) Prior Publication Data
US 2021/0066879 A1 Mar. 4, 2021

(30) Foreign Application Priority Data
Dec. 28, 2017 (JP) .............................. JP2017-254758

(51) Int. Cl.
*G02B 6/02* (2006.01)
*G02B 6/036* (2006.01)
(Continued)

(52) U.S. Cl.
CPC ..... *G02B 6/02047* (2013.01); *G02B 6/03616* (2013.01); *G02B 6/02023* (2013.01);
(Continued)

(58) Field of Classification Search
CPC ............ G02B 6/02009; G02B 6/02023; G02B 6/02047; H01S 3/06762; H01S 3/1618
See application file for complete search history.

(56) References Cited

U.S. PATENT DOCUMENTS 10,620,368 B2 * 4/2020 Kishi .................... H01S 3/2308
2006/0045450 A1 3/2006 Bickham
(Continued)

FOREIGN PATENT DOCUMENTS

CN 104737048 A 6/2015
CN 109417263 A 3/2019
(Continued)

OTHER PUBLICATIONS

Office Action issued in the counterpart Japanese Patent Application No. 2019-562487, dated Oct. 6, 2020 (9 pages).
(Continued)

*Primary Examiner* — Michael Stahl
(74) *Attorney, Agent, or Firm* — Osha Bergman Watanabe & Burton LLP

(57) ABSTRACT

An optical fiber includes a core that propagates a light that includes a wavelength equal to or larger than 1000 nm and equal to or smaller than 1100 nm. The light propagates in the core at least in an LP01 mode and an LP11 mode. A difference between a propagation constant of the light in the LP01 mode and a propagation constant of the light in the LP11 mode is 1735 rad/m or larger and 4000 rad/m or smaller.

20 Claims, 11 Drawing Sheets

(51) Int. Cl.
    *H01S 3/067*     (2006.01)
    *H01S 3/16*     (2006.01)

(52) U.S. Cl.
    CPC ....... *H01S 3/06733* (2013.01); *H01S 3/06762* (2013.01); *H01S 3/1618* (2013.01)

(56) References Cited

U.S. PATENT DOCUMENTS

| | | | |
|---|---|---|---|
| 2010/0079854 A1* | 4/2010 | Tanigawa | G02B 6/02033 359/341.1 |
| 2011/0081123 A1 | 4/2011 | Pare et al. | |
| 2013/0071114 A1 | 3/2013 | Bickham et al. | |
| 2013/0336343 A1* | 12/2013 | Miyabe | H01S 3/06716 359/341.1 |
| 2017/0115450 A1* | 4/2017 | Mo | G02B 6/0288 |
| 2019/0278019 A1* | 9/2019 | Downie | G02B 6/02019 |
| 2021/0057866 A1* | 2/2021 | Kitahara | H01S 3/06729 |

FOREIGN PATENT DOCUMENTS

| | | |
|---|---|---|
| EP | 3462553 A1 | 4/2019 |
| JP | 2010534354 A | 11/2010 |
| JP | 2014530374 A | 11/2014 |
| JP | 2016-051859 A | 4/2016 |
| JP | 201726672 A | 2/2017 |
| JP | 6255532 B1 | 12/2017 |
| JP | 2018-006596 A | 1/2018 |
| WO | 2013/038794 A1 | 3/2013 |

OTHER PUBLICATIONS

Basic Optics for Optical Fiber, Fiber Optics for Sale Co. [online], dated Sep. 16, 2010, https://www.fiberoptics4sale.com/blogs/archive-posts/95048070-basic-optics-for-optical-fiber[URL] (21 pages).

Yasuji Murakami, Introduction to Fiberoptic Communications, Corona Publishing Co., Ltd., dated Dec. 26, 2003, pp. 93-98 (8 pages).

Office Action issued in the counterpart Japanese Patent Application No. 2019-562487, dated Mar. 2, 2021 (6 pages).

* cited by examiner

PROPAGATION CONSTANT DIFFERENCE
BETWEEN LP01 MODE AND LP11 MODE (rad./m)

EFFECTIVE SECTIONAL AREA OF LIGHT IN LP01 MODE $A_{eff}[\mu m^2]$

OPTICAL FIBER AND LASER DEVICE

TECHNICAL FIELD

The present invention relates to an optical fiber and a laser device that can suppress deterioration in beam quality while suppressing stimulated Raman scattering.

BACKGROUND

A fiber laser device is used in various field such as a laser machining field and a medical field because the fiber laser device is excellent in light condensing performance, has high power density, and can obtain light that becomes a small beam spot. In such a fiber laser device, power of emitted light is increased. However, when power density of light in an optical fiber increases, wavelength conversion of the light due to the stimulated Raman scattering easily occurs and light having an unintended wavelength is sometimes emitted. In this case, the light reflected on a workpiece or the like returns to the fiber laser device again and is amplified. Consequently, in some case, the amplitude of light having a wavelength that should be amplified in design becomes unstable and an output becomes unstable.

Examples of a method of suppressing the stimulated Raman scattering in the optical fiber include a method of increasing an effective sectional area of light propagating in a core. Examples of a method of increasing the effective sectional area include a method of increasing the diameter of the core and a method of reducing a relative refractive index difference of the core with respect to a clad. When the diameter of the core is increased, since light confining power of the core increases, the optical fiber bends to be converted into a multimode. Therefore, examples of a method of suppressing the light confining power of the core include a method of reducing the relative refractive index difference of the core with respect to the clad. However, when the relative refractive index difference of the core with respect to the clad is reduced, the light propagating in the core is easily affected by a macro bend and a micro bend. Accordingly, it is requested to adjust the relative refractive index difference of the core with respect to the clad while properly increasing the diameter of the core.

However, even when the core is designed as explained above, there is a limit in the size of an effective sectional area of light in an LP01 mode when it is attempted to propagate the light in a single mode. Therefore, it is attempted to increase the effective sectional area of the light in the LP01 mode by configuring a fiber laser device using an optical fiber including a core capable of propagating light in a few modes like an optical fiber described in Patent Literature 1 described below.
[Patent Literature 1] JP2016-51859 A In a fiber laser device, it is preferable that beam quality of emitted light is excellent from, for example, the viewpoint of light condensing performance. Accordingly, there is a demand for suppressing light in a mode other than a basic mode from being excited even when the effective sectional area of the light in the LP01 mode is increased by using the optical fiber including the core capable of propagating light in the few modes as explained above. Note that the beam quality is indicated by, for example, $M^2$ (M square).

SUMMARY

One or more embodiments of the present invention provide an optical fiber and a laser device that can suppress deterioration in beam quality while suppressing stimulated Raman scattering.

One or more embodiments of the present invention is an optical fiber in which light having at least a part of a wavelength equal to or larger than 1000 nm and equal to or smaller than 1100 nm is capable of propagating in a core at least in an LP01 mode and an LP11 mode, wherein a difference between a propagation constant of the light in the LP01 mode and a propagation constant of the light in the LP11 mode is 1735 rad/m or larger and 4000 rad/m or smaller.

Light having a wavelength of 1060 nm propagates in the core at least in the LP01 mode and the LP11 mode and the difference between the propagation constant of the light in the LP01 mode and the propagation constant of the light in the LP11 mode is set to 4000 rad/m or smaller. Therefore, compared with a single-mode fiber, it is possible to increase the effective sectional area of the light in the LP01 mode. Accordingly, it is possible to suppress the stimulated Raman scattering. The present inventors have found that deterioration in beam quality is suppressed when the difference between the propagation constant of the light in the LP01 mode and the propagation constant of the light in the LP11 mode propagating in the optical fiber is 1730 rad/m or larger. This is considered to be because, when such a difference is present, shift from the light in the LP01 mode to the light in the LP11 mode is suppressed. The present inventors have found that, even in an optical fiber in which light having a wavelength equal to or longer than 1000 nm and equal to or shorter than 1100 nm is capable of propagating in the core at least in the LP01 mode and the LP11 mode, deterioration in beam quality can also be suppressed when the optical fiber has the propagation constant difference. Accordingly, with the optical fiber according to one or more embodiments of the present invention, it is possible to suppress deterioration in beam quality while suppressing the stimulated Raman scattering.

In the optical fiber, light having at least a wavelength of 1060 nm may be capable of propagating in the core at least in the LP01 mode and the LP11 mode.

In the optical fiber, light having at least a wavelength equal to or longer than 1060 nm and equal to or shorter than 1093 nm may be capable of propagating in the core at least in the LP01 mode and the LP11 mode. Light having at least a wavelength equal to or longer than 1030 nm and equal to or shorter than 1093 nm may be capable of propagating in the core at least in the LP01 mode and the LP11 mode. Alternatively, in the optical fiber, light having at least a wavelength longer than 1060 nm and equal to or shorter than 1080 nm may be capable of propagating in the core at least in the LP01 mode and the LP11 mode.

In one or more embodiments, the difference between the propagation constant of the light in the LP01 mode and the propagation constant of the light in the LP11 mode is smaller than 1850 rad/m.

Since the optical fiber is configured in this way, it is possible to further increase the effective sectional area of the light in the LP01 mode and further suppress the stimulated Raman scattering.

In one or more embodiments, a theoretical cutoff wavelength of the light in the LP11 mode is longer than 1635 nm.

When the optical fiber configured in this way is bent at a curvature radius equal to or larger than 40 mm, it is possible to suppress a leak of the light in the LP11 mode having the wavelength of 1060 nm. Therefore, in a laser device or the like, even when the optical fiber is bent at the curvature radius equal to or larger than 40 mm, when a part of the light in the LP01 mode shifts to the light in the LP11 mode, it is possible to stably propagate the light in the LP11 mode and suppress a loss of the light. Note that this tendency is the same in an optical fiber in which light having a wavelength equal to or longer than 1000 nm and equal to or shorter than 1100 nm is capable of propagating in a core at least in the LP01 mode and the LP11 mode.

In one or more embodiments, a theoretical cutoff wavelength of light in an LP02 mode is 1760 nm or shorter.

When the optical fiber configured in this way is bent at a curvature radius equal to or smaller than 60 mm, it is possible to lose the light in the LP02 mode having a wavelength of 1060 nm. Therefore, in the laser device or the like, when the optical fiber is bent at the curvature radius equal to or smaller than 60 mm, even when a part of the light in the LP01 mode shifts to the light in the LP11 mode and further shifts to the light in the LP02 mode, since the light in the LP02 mode is lost, it is possible to suppress deterioration in beam quality of emitted light. Note that this tendency is the same in an optical fiber in which light having a wavelength equal to or longer than 1000 nm and equal to or shorter than 1100 nm is capable of propagating in a core at least in the LP01 mode and the LP11 mode.

In this case, the theoretical cutoff wavelength of the light in the LP11 mode is longer than 1760 nm in one or more embodiments.

Since the optical fiber is configured in this way, when the optical fiber is bent at a curvature radius equal to or smaller than 60 mm, it is possible to appropriately propagate the light in the LP11 mode while losing the light in the LP02 mode having the wavelength of 1060 nm. Note that this tendency is the same in an optical fiber in which light having a wavelength equal to or longer than 1000 nm and equal to or shorter than 1100 nm is capable of propagating in a core at least in the LP01 mode and the LP11 mode.

In one or more embodiments, a theoretical cutoff wavelength of the light in the LP02 mode is shorter than 1513 nm.

Since the optical fiber is configured in this way, in the laser device or the like, when the optical fiber is bent at the curvature radius equal to or smaller than 60 mm, most of the light in the LP02 mode having the wavelength of 1060 nm leaks from the core. The propagation of the light is suppressed in the core. Therefore, even when the light in the LP11 mode shifts to the light in the LP02 mode, when the light passes a portion bent at the curvature radius equal to or smaller than 60 mm of the optical fiber, since most of the light in the LP02 mode leaks from the core, it is possible to remove the light in the LP02 mode. Therefore, after the light passes the portion bent at the curvature radius equal to or smaller than 60 mm of the optical fiber, light with suppressed deterioration in beam quality propagates. Accordingly, it is possible to suppress deterioration in beam quality of emitted light. Note that this tendency is the same in an optical fiber in which light having a wavelength equal to or longer than 1000 nm and equal to or shorter than 1100 nm is capable of propagating in a core at least in the LP01 mode and the LP11 mode.

At least ytterbium may be added to the core.

When at least ytterbium is added to the core to form an amplification optical fiber, by using the amplification optical fiber, it is possible to configure a fiber laser device that emits light having at least a part of the wavelength equal to or longer than 1000 nm and equal to or shorter than 1100 nm. Therefore, by using such an amplification optical fiber, it is possible to configure a laser device that can suppress deterioration in beam quality while suppressing the stimulated Raman scattering.

One or more embodiments of the present invention include a laser device including the optical fiber described in any one of the above descriptions.

With the optical fiber included in the laser device, as explained above, it is possible to suppress deterioration in beam quality while suppressing the stimulated Raman scattering. Therefore, with such a laser device, it is possible to emit light with a suppressed wavelength shift and suppressed deterioration in beam quality.

As explained above, according to one or more embodiments of the present invention, the optical fiber and the laser device that can suppress deterioration in beam quality while suppressing the stimulated Raman scattering are provided.

DETAILED DESCRIPTION

Embodiments of an optical fiber and a laser device according to the present invention are explained in detail below with reference to the drawings. The embodiments illustrated below are for facilitating understanding of the present invention and are not for limitedly interpreting the present invention. The present invention can be changed and improved without departing from the gist of the present invention. Note that, for easiness of understanding, scales of the figures and scales described in the following explanation are sometimes different.

Figure 1:
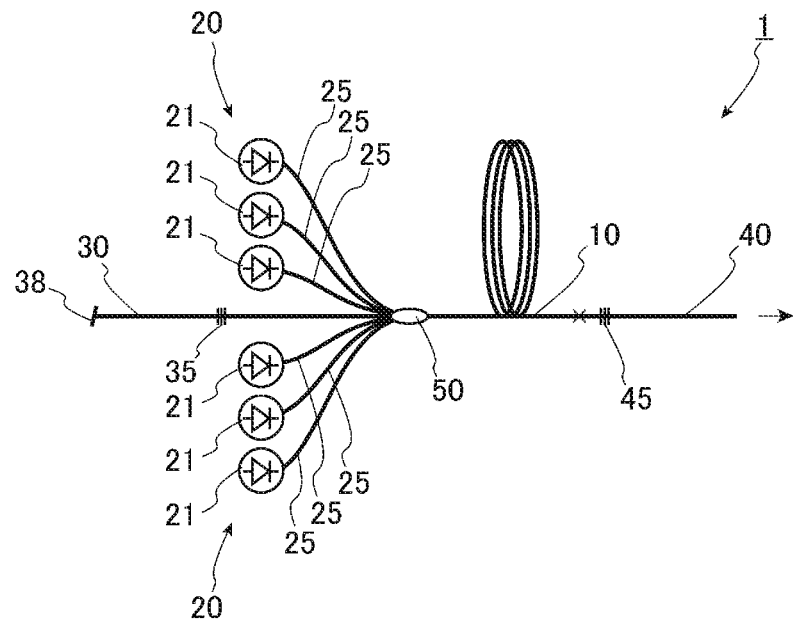
FIG. 1 is a diagram illustrating a laser device according to one or more embodiments of the present invention.

FIG. 1 is a diagram illustrating a laser device according to one or more embodiments. As illustrated in FIG. 1, a laser device 1 in one or more embodiments is a resonator-type fiber laser device. The laser device 1 includes, as main components, an amplification optical fiber 10, a pumping light source 20, a first optical fiber 30, a first FBG 35 provided in the first optical fiber 30, a second optical fiber 40, a second FBG 45 provided in the second optical fiber 40, and an optical combiner 50.

Figure 2:
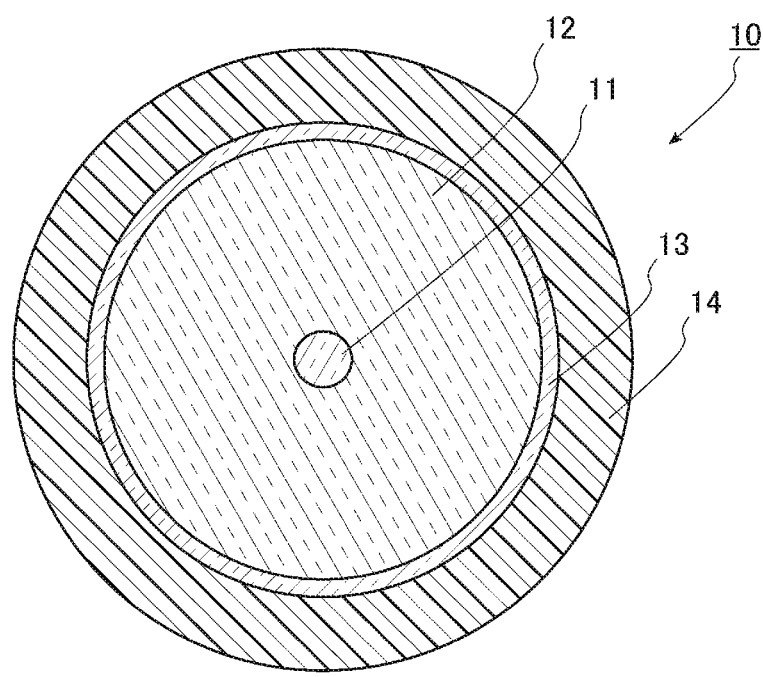
FIG. 2 is a diagram illustrating a state of a cross section perpendicular to the longitudinal direction of an amplification optical fiber according to one or more embodiments of the present invention.

FIG. 2 is a sectional view illustrating the structure of a cross section of the amplification optical fiber 10 illustrated in FIG. 1. As illustrated in FIG. 2, the amplification optical fiber 10 is formed in a so-called double clad structure including, as main components, a core 11, an inner clad 12 surrounding the outer circumferential surface of the core 11 without a gap, an outer clad 13 coating the outer circumferential surface of the inner clad 12, and a coating layer 14 coating the outer clad 13. A refractive index of the inner clad 12 is set lower than a refractive index of the core 11. A refractive index of the outer clad 13 is set lower than the refractive index of the inner clad 12.

The core 11 is made of, for example, quartz added with a dopant such as germanium (Ge) for increasing a refractive index or quartz not added with the dopant for increasing a refractive index. Further, the core 11 is added with at least ytterbium (Yb) pumped by pumping light emitted from the pumping light source 20 as a dopant for amplifying light as explained below. When a refractive index of the core 11 is higher than a refractive index of quartz added with no dopant, the inner clad 12 is made of, for example, the quartz added with no dopant or quartz added with a dopant such as fluorine (F) for reducing a refractive index. When the refractive index of the core 11 is the same as or lower than the refractive index of the quartz added with no dopant, the inner clad 12 is made of the quartz added with the dopant such as fluorine (F) for reducing a refractive index. The outer clad 13 is made of resin or quartz. Examples of the resin include ultraviolet curing resin. Examples of the quartz include quartz added with a dopant such as fluorine (F) for reducing a refractive index to be lower than the refractive index of the inner clad 12. Examples of a material forming the coating layer 14 include ultraviolet curing resin. When the outer clad 13 is made of resin, the ultraviolet curing resin is ultraviolet curing resin different from the resin forming the outer clad.

The amplification optical fiber 10 is a few-mode fiber. When light having at least a wavelength of 1060 nm propagates in the core 11, as the light, light in a high-order mode equal to or higher than a secondary LP mode propagates other than light in an LP01 mode, which is a basic mode. Examples of the light in the high-order mode include light in an LP11 mode, light in an LP21 mode, and light in an LP02 mode.

The pumping light source 20 is configured from a plurality of laser diodes 21. In one or more embodiments, the laser diodes 21 are Fabry-Perot semiconductor lasers including GaAs semiconductor as a material and emit pumping lights having a center wavelength of 915 nm, for example. The laser diodes 21 of the pumping light source 20 are connected to respective optical fibers 25. The pumping lights emitted from the laser diodes 21 propagate in the optical fibers 25 as, for example, multi-mode light.

The optical fibers 25 are each connected to one end of the amplification optical fiber 10 in the optical combiner 50. Specifically, cores of the optical fibers 25 and the inner clad 12 of the amplification optical fiber 10 are connected such that the cores of the optical fibers 25 are optically combined with the inner clad 12 of the amplification optical fiber 10. Therefore, the pumping lights emitted by the laser diodes 21 are made incident on the inner clad 12 of the amplification optical fiber 10 via the respective optical fibers 25 and propagate mainly in the inner clad 12.

Figure 3:
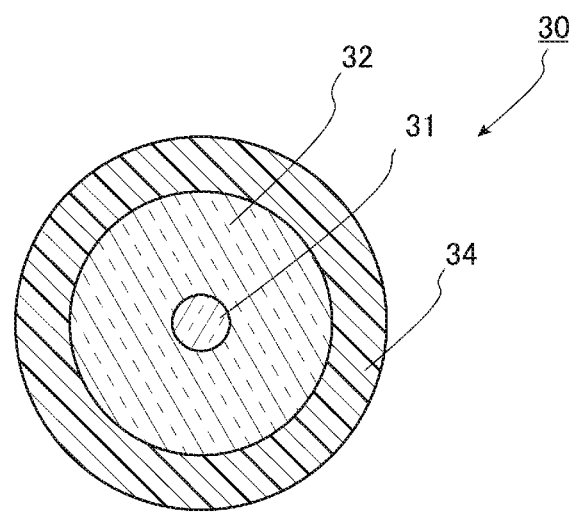
FIG. 3 is a diagram illustrating a state of a cross section perpendicular to the longitudinal direction of a first optical fiber according to one or more embodiments of the present invention.

FIG. 3 is a diagram illustrating a state of the first optical fiber 30. The first optical fiber 30 includes, as main components, a core 31, a clad 32 surrounding the outer circumferential surface of the core 31 without a gap, and a coating layer 34 coating the clad 32. The configuration of the core 31 is, for example, set the same as the configuration of the core 11 of the amplification optical fiber 10 except that a rare earth element such as ytterbium is not added. The diameter of the core 31 is set, for example, the same as the diameter of the core 11. The clad 32 is configured, for example, the same as the inner clad 12 except that the diameter of the clad 32 is smaller than the diameter of the inner clad 12 of the amplification optical fiber 10. The coating layer 34 is configured, for example, the same as the configuration of the coating layer 14 of the amplification optical fiber 10.

The first optical fiber 30 is connected to one end of the amplification optical fiber 10 together with the optical fibers 25 in the optical combiner 50. Specifically, the core 11 of the amplification optical fiber 10 and the core 31 of the first optical fiber 30 are connected such that the core 31 of the first optical fiber 30 is optically combined with the core 11 of the amplification optical fiber 10. The first optical fiber 30 is a few-mode fiber and propagates light same as the light propagated by the core 11 of the amplification optical fiber 10. Therefore, lights in the individual LP modes propagating in the core 11 of the amplification optical fiber 10 can directly propagate in the core 31 of the first optical fiber 30.

A photosensitive element such as germanium is added to the core 31 of the first optical fiber 30. This photosensitivity is a characteristic that a refractive index changes when light having a predetermined wavelength is irradiated. The characteristic is used and the first FBG 35 is provided in the core 31 of the first optical fiber 30. In this way, the first FBG 35 is disposed on one side of the amplification optical fiber 10 and is optically combined with the core 11 of the amplification optical fiber 10. In the first FBG 35, a high refractive index portion where a refractive index is higher than a refractive index of portions other than the first FBG 35 of the core 31 and a low refractive index portion where a refractive index is the same as the refractive index of the portions other than the first FBG 35 of the core 31 are cyclically repeated along the longitudinal direction of the core 31. This repetition pattern of the high refractive index portion is formed by, for example, irradiating an ultraviolet ray on a part to be formed as the high refractive index portion. The first FBG formed in this way is configured to reflect light including at least a wavelength of 1060 nm in light emitted in a state in which ytterbium added to the core 11 of the amplification optical fiber 10 is changed to a pumped state. The reflectance of the first FBG 35 is higher than the reflectance of the second FBG 45 explained below. The first FBG 35 reflects, for example, at 99% or more, the light having the wavelength of 1060 nm in the light emitted by the ytterbium.

Note that a terminal section 38 that converts light into heat is provided on the opposite side of a side of the first optical fiber 30 connected to the amplification optical fiber 10.

In the second optical fiber 40, the diameter of a clad is the same as the diameter of the inner clad 12 of the amplification optical fiber 10. The second optical fiber 40 is configured the same as the amplification optical fiber 10 except that a dopant for amplifying light is not added to a core. Therefore, the second optical fiber 40 is the same few-mode fiber as the amplification optical fiber 10. The second optical fiber 40 can propagate the same light as the light propagated by the core 11 of the amplification optical fiber 10. The second optical fiber 40 is connected such that the core 11 of the amplification optical fiber 10 and the core of the second optical fiber 40 are optically combined at the other end of the amplification optical fiber 10. Therefore, light in a few modes propagating in the core 11 of the amplification optical fiber 10 propagates in the core of the second optical fiber 40 while keeping the few modes.

The second FBG 45 is provided in the core of the second optical fiber 40. In this way, the second FBG 45 is disposed on the other side of the amplification optical fiber 10 and optically combined with the core 11 of the amplification optical fiber 10. In the second FBG 45, as in the first FBG 35, a high refractive index portion and a low refractive index portion are cyclically repeated and formed. The second FBG 45 is configured to reflect, at reflectance lower than the reflectance of the first FBG 35, the light including the wavelength of 1060 nm reflected by the first FBG 35. When the light reflected by the first FBG 35 is made incident on the second FBG 45, the second FBG 45 reflects the light at reflectance of, for example, approximately 10%. In this way, a resonator is formed by the first FBG 35, the amplification optical fiber 10, and the second FBG 45. In one or more embodiments, nothing is connected, in particular, to the other end on the opposite side of the amplification optical fiber side of the second optical fiber 40. However, a glass rod or the like may be connected to the other end.

Next, the operation of the laser device 1 is explained.

First, pumping lights are emitted from the respective laser diodes 21 of the pumping light source 20. The pumping lights are made incident on the inner clad 12 of the amplification optical fiber 10 via the optical fibers 25 and propagate mainly in the inner clad 12. The pumping lights propagating in the inner clad 12 pump the ytterbium added to the core 11 when passing through the core 11. The ytterbium changed to a pumped state emits natural emission light in a specific wavelength band. Starting from this natural emission light, the light including the wavelength of 1060 nm reflected in common on the first FBG 35 and the second FBG 45 resonates between the first FBG 35 and the second FBG 45. When the resonating light propagates in the core 11 of the amplification optical fiber 10, the ytterbium in the pumped state causes stimulated emission and the resonating light is amplified. A part of the resonating light is transmitted through the second FBG 45 and emitted from the second optical fiber 40. The laser device 1 changes to a laser oscillation state when a gain and a loss in the resonator including the first FBG 35, the amplification optical fiber 10, and the second FBG 45 are equal. Light having fixed power is emitted from the second optical fiber 40.

Note that most of the light transmitted through the first FBG 35 from the amplification optical fiber 10 side is converted into heat by the terminal section 38 and disappears.

Incidentally, as explained above, the amplification optical fiber 10, the first optical fiber 30, and the second optical fiber 40 are each a few-mode fiber. Therefore, the light resonating between the first FBG 35 and the second FBG 45 and the light transmitted through the second FBG 45 include, besides the light in the basic mode, lights in several high-order modes equal to or higher than the secondary LP mode. Besides the light in the basic mode, the lights in the several high-order modes equal to or higher than the secondary LP mode propagate in the second optical fiber 40 and are emitted from the laser device 1. However, as explained below, in the amplification optical fiber 10, the first optical fiber 30, and the second optical fiber 40, propagation in high-order modes equal to or high than the LP02 mode is reduced. Energy of lights in the LP02 mode or higher modes propagating in the amplification optical fiber 10, the first optical fiber 30, and the second optical fiber 40 is reduced.

A propagation constant of light propagating in a core of an optical fiber is explained. Note that, in the following explanation, when a clad is referred to, the clad means the clad 32 of the first optical fiber 30, the clad of the second optical fiber 40, or the inner clad 12 of the amplification optical fiber 10. The propagation constant is a constant concerning phase fluctuation in the case in which a light wave propagates. Since light is a wave, when the amplitude of the light is represented as A and the distance from the center of the core is represented as z, an electric field E in the core is indicated by Expression (1) described below.

$$E = A \exp[-(\alpha + i\beta)z] \quad (1)$$

Note that $\alpha$ is an extinction coefficient indicating extinction of the wave, $\beta$ is a propagation constant indicating propagation of the wave, and i is an imaginary number unit. The above Expression (1) can be described for each of the lights in the individual modes propagating in the core. The light in the LP01 mode and the light in the LP11 mode have extinction coefficients $\alpha$ different from each other and have propagation constants $\beta$ different from each other. Since the propagation constant $\beta$ indicate the propagation of the wave, specifying the propagation constant $\beta$ f the light propagating in the core is specifying an effective refractive index $n_{eff}$ of the light propagating in the core. When the wavelength of the light propagating in the core is represented as $\lambda$, the effective refractive index $n_{eff}$ can be indicated by Expression (2) described below.

$$n_{eff} = \lambda \beta / 2\pi \quad (2)$$

Incidentally, an effective sectional area $A_{eff}$ of the light propagating in the core of the optical fiber is a value correlating to the effective refractive index $n_{eff}$ of the light. Therefore, the effective sectional area $A_{eff}$ is considered to be a value correlating to the propagation constant $\beta$ of the light.

Next, when the difference between a propagation constant of the light in the LP01 mode and a propagation constant of the light in the LP11 mode propagating in the core is represented as $\Delta\beta$, the propagation constant difference $\Delta\beta$ also correlates with the effective sectional area $A_{eff}$.

Figure 4:
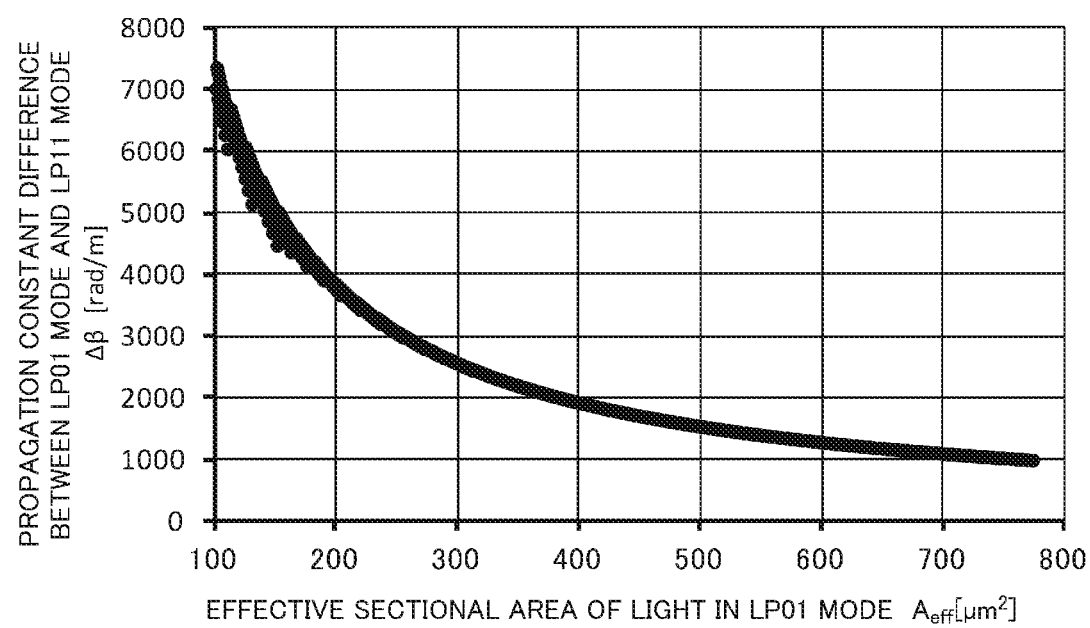
FIG. 4 is a simulation diagram illustrating a relation between an effective sectional area of light in an LP01 mode having a wavelength of 1060 nm propagating in an optical fiber and a difference between a propagation constant of the light in the LP01 mode and a propagation constant of light in an LP11 mode according to one or more embodiments of the present invention.

FIG. 4 is a simulation diagram illustrating a relation between the effective sectional area of the light in the LP01 mode having the wavelength of 1060 nm propagating in the optical fiber and the propagation constant difference $\Delta\beta$ between the light in the LP01 mode and the light in the LP11 mode. In the simulation in FIG. 4, a refractive index profile of the core was a refractive index profile which is fixed in a radial direction, that is, stepwise. In the simulation, the diameter of the core was changed from 10 μm to 40 μm at a 1 μm interval and a relative refractive index difference of the core with respect to the clad was changed from 0.1% to 0.2% at a 0.005% interval. From FIG. 4, it is seen that the propagation constant difference $\Delta\beta$ correlates with the effective sectional area $A_{eff}$ of the light in the LP01 mode as explained above. From FIG. 4, if the propagation constant difference $\Delta\beta$ between the light in the LP01 mode and the light in the LP11 mode is 4000 rad/m or smaller, the effective sectional area of the light in the LP01 mode can be increased to 191 μm$^2$ or larger. If the effective sectional area of the light in the LP01 mode is 191 μm$^2$ or larger, it is possible to reduce energy density of the light and suppress the stimulated Raman scattering from occurring. If the propagation constant difference $\Delta\beta$ is 2500 rad/m or smaller, the effective sectional area of the light in the LP01 mode can be increased to 300 μm$^2$ or larger. If the effective sectional area of the light in the LP01 mode is 300 μm$^2$ or larger, it is possible to further reduce energy density of the light and further suppress the stimulated Raman scattering from occurring.

Figure 5:
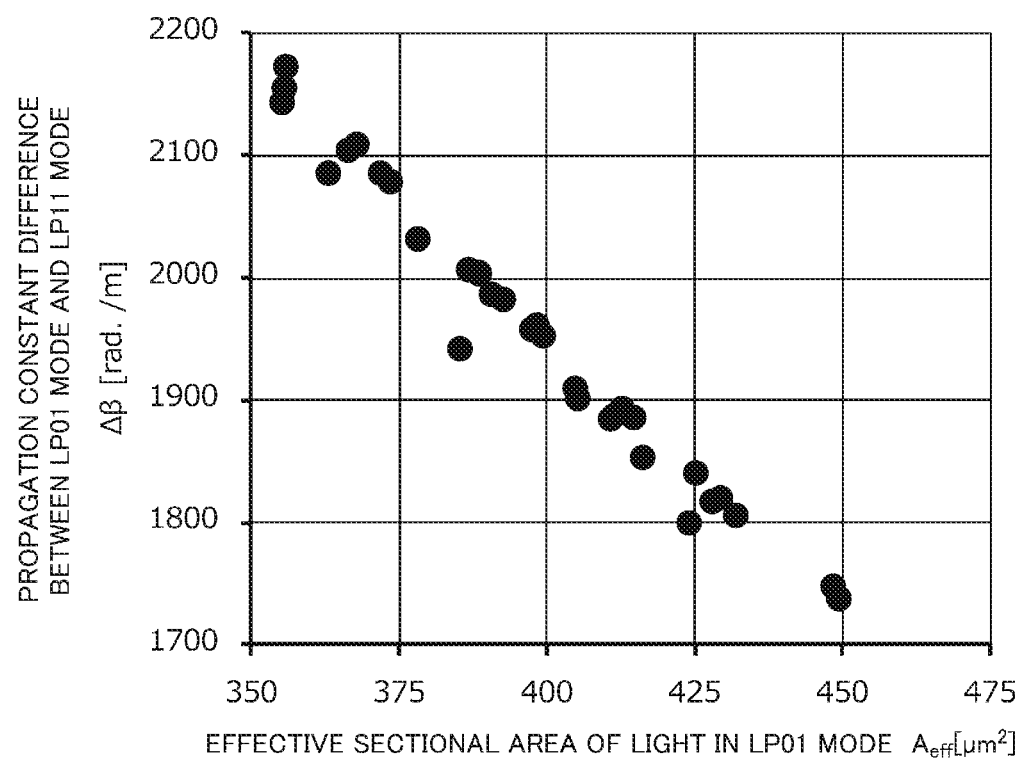
FIG. 5 is a diagram of measurement values illustrating the relation between the effective sectional area of the light in the LP01 mode having the wavelength of 1060 nm propagating in the optical fiber and the difference between the propagation constant of the light in the LP01 mode and the propagation constant of light in an LP11 mode according to one or more embodiments of the present invention.

FIG. 5 is a diagram of measurement values indicating a relation between the effective sectional area of the light in the LP01 mode having the wavelength of 1060 nm propagating in the optical fiber and the propagation constant difference $\Delta\beta$ between the light in the LP01 mode and the light in the LP11 mode. In the measured optical fiber, the refractive index profile of the core is stepwise, the diameter of the core is 28 μm, and the relative refractive index difference of the core with respect to the clad is 0.12%. Theoretically, lights in the LP01 mode, the LP11 mode, the LP21 mode, the LP02 mode, an LP31 mode, and an LP12 mode are capable of propagating in the optical fiber at the wavelength of 1060 nm. In the measurement values illustrated in FIG. 5, it is also seen that the propagation constant difference $\Delta\beta$ correlates with the effective sectional area $A_{eff}$ of the light in the LP01 mode as explained above. From FIG. 4 and FIG. 5, if the propagation constant difference $\Delta\beta$ is smaller than 1850 rad/m, the effective sectional area of the light in the LP01 mode can be increased to 420 μm$^2$ or larger. If the effective sectional area of the light in the LP01 mode is larger than 420 μm$^2$, it is possible to further reduce the energy density of the light and further suppress the stimulated Raman scattering from occurring.

Figure 6:
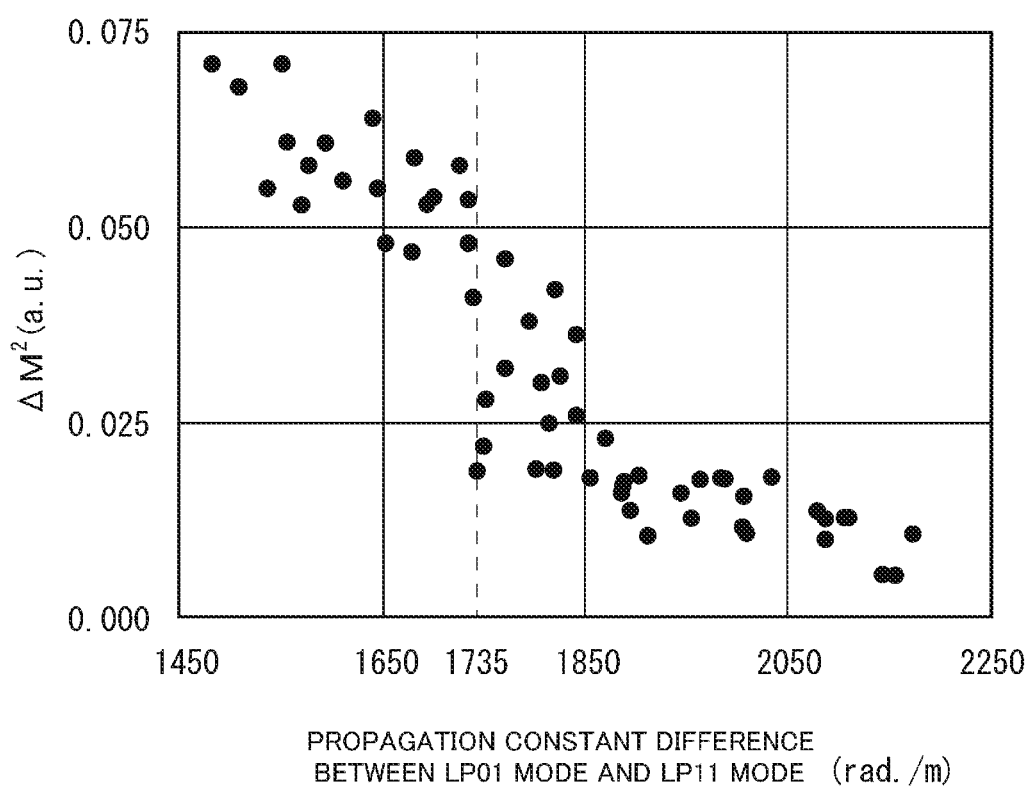
FIG. 6 is a diagram of measurement values illustrating a relation between a propagation constant difference ($\Delta\beta$) between the light in the LP01 mode and the light in the LP11 mode and a deterioration amount ($\Delta M^2$) of beam quality ($M^2$) due to propagation in the optical fiber according to one or more embodiments of the present invention.

Next, a relation between the propagation constant difference $\Delta\beta$ between the light in the LP01 mode and the light in the LP11 mode and beam quality of light emitted from the optical fiber is explained. FIG. 6 is a diagram of measurement values illustrating a relation between the propagation constant difference $\Delta\beta$ between the light in the LP01 mode and the light in the LP11 mode and a deterioration amount $\Delta M^2$ of beam quality $M^2$ due to propagation in the optical fiber. Measurement in FIG. 6 was performed by, using the optical fiber used in FIG. 5, making the light in the basic mode incident from one end of the optical fiber and measuring $M^2$ of light emitted from the other end. The beam quality tends to be deteriorated when the light is made incident on the optical fiber. A deterioration amount of the beam quality in making the light incident on the optical fiber is subtracted from the measurement value to calculate the deterioration amount $\Delta M^2$ of the beam quality $M^2$ due to the propagation in the optical fiber. In FIG. 6, the deterioration amount $\Delta M^2$ of the beam quality $M^2$ is plotted on the vertical axis. $M^2$ of light including only the light in the basic mode is 1. A value of $M^2$ is larger as a higher-order mode is excited and the beam quality is further deteriorated. Therefore, a larger deterioration amount $\Delta M^2$ of the beam quality in FIG. 6 indicates that beam quality of emitted light is further deteriorated. As it is seen from FIG. 6, in this optical fiber, if the propagation constant difference $\Delta\beta$ between the light in the LP01 mode and the light in the LP11 mode is 1735 [rad/m] or more, the deterioration amount $\Delta M^2$ can be reduced to 0.05 or less. Satisfactory beam quality can be obtained. If the deterioration amount $\Delta M^2$ is 0.05 or less, the influence on light condensing performance of emitted light can be sufficiently reduced. The optical fiber used in the laser device can emit light having sufficiently satisfactory beam quality. In this way, from FIG. 6, it is seen that, if the propagation constant difference $\Delta\beta$ between the light in the LP01 mode and the light in the LP11 mode is 1735 [rad/m] or more, deterioration in beam quality of light emitted from the optical fiber is suppressed. Note that, when the propagation constant difference $\Delta\beta$ is 1850 [rad/m] or more, the deterioration amount $\Delta M^2$ can be reduced to smaller than 0.02. The beam quality is more satisfactory. Therefore, it is seen that, if the propagation constant difference $\Delta\beta$ between the light in the LP01 mode and the light in the LP11 mode is 1850 [rad/m] or more, the deterioration in the beam quality of the light emitted from the optical fiber is further suppressed.

Next, a relation among the diameter of the core, a relative refractive index difference $\Delta n$ of the core with respect to the clad, and the propagation constant difference $\Delta\beta$ between the light in the LP01 mode and the light in the LP11 mode is explained. When the refractive index of the core is represented as $n_1$ and the refractive index of the clad is represented as $n_2$, the relative refractive index difference $\Delta n$ of the core with respect to the clad is indicated by Expression (3) described below.

$$\Delta n = (n_1^2 - n_2^2)/(2n_1^2) \quad (3)$$

Figure 7:
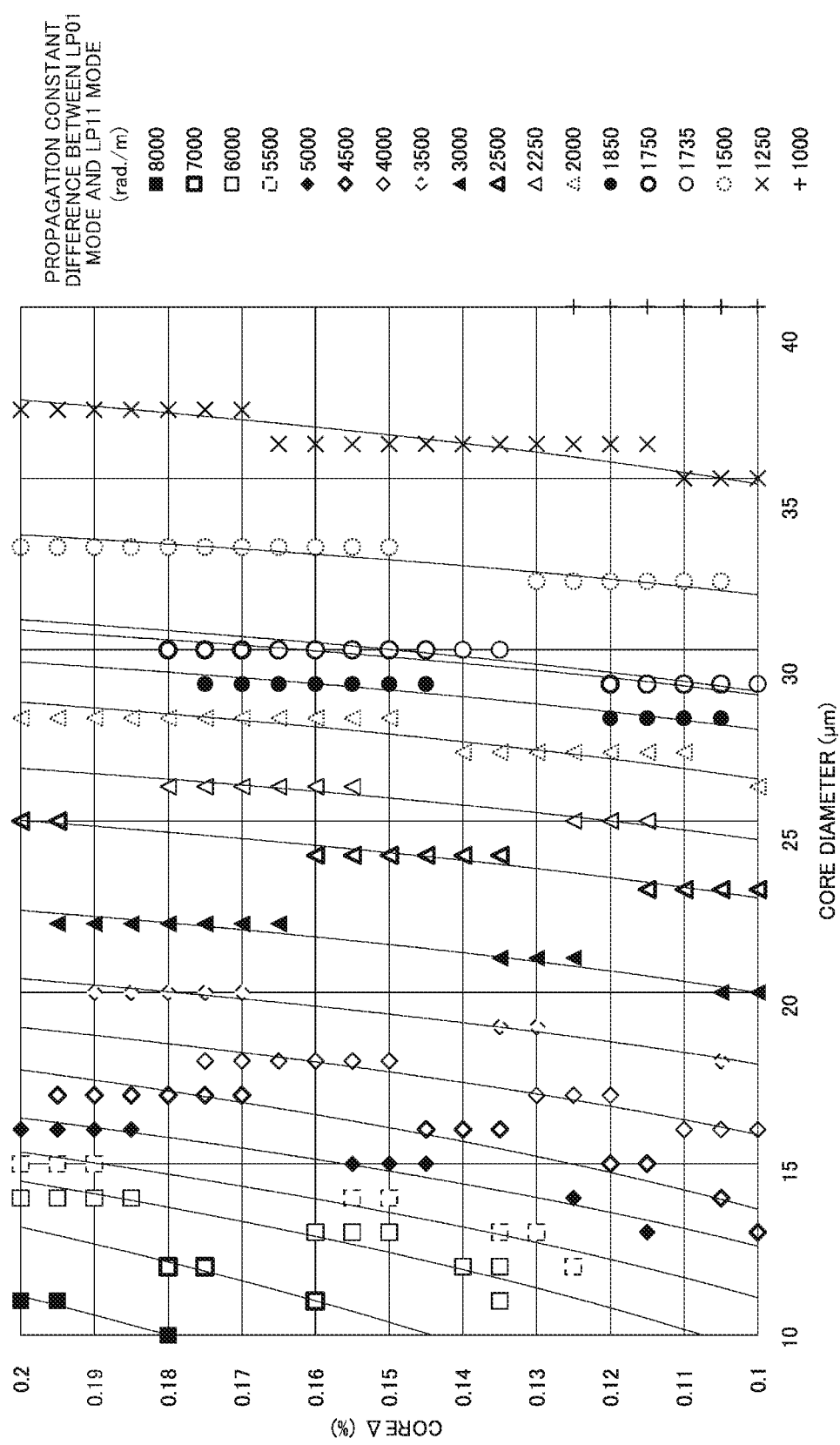
FIG. 7 is a diagram illustrating, for each difference between the propagation constant of the light in the LP01 mode and the propagation constant of the light in the LP11 mode, a relation between the diameter of a core and a relative refractive index difference of the core with respect to a clad according to one or more embodiments of the present invention.

FIG. 7 is a diagram illustrating, for each propagation constant difference $\Delta \beta$ between the light in the LP01 mode and the light in the LP11 mode, in a simulation, a relation between the diameter of the core and the relative refractive index difference $\Delta n$ of the core with respect to the clad. Note that, in the figure as well, a refractive index profile of the core is fixed in the radial direction, that is, stepwise. As illustrated in FIG. 7, if the core diameter and the relative refractive index difference $\Delta n$ are satisfied to be present in a region further on the right side than any line indicating the propagation constant difference $\Delta \beta$ between the light in the LP01 mode and the light in the LP11 mode, it is considered possible to reduce a propagation constant difference to the propagation constant difference $\Delta \beta$ or less. As an example, as illustrated in FIG. 7, for example, when the relative refractive index difference $\Delta n$ is 0.10, if the diameter of the core is 16 μm or larger, the propagation constant difference $\Delta \beta$ can be reduced to 4000 rad/m or smaller. That is, when FIG. 4 is considered, if the diameter of the core is 16 μm or larger, the effective sectional area of the light in the LP01 mode can be increased to 191 μm² or larger. As illustrated in FIG. 7, it is seen that, for example, when the relative refractive index difference $\Delta n$ is 0.10, if the diameter of the core is 23 μm or larger, the propagation constant difference $\Delta \beta$ can be reduced to 2500 rad/m or smaller. That is, when FIG. 4 is considered, if the diameter of the core is 23 μm or larger, the effective sectional area of the light in the LP01 mode can be increased to 300 μm² or larger. As illustrated in FIG. 7, it is seen that, for example, when the relative refractive index difference $\Delta n$ is 0.10, if the diameter of the core is larger than 28 μm, the propagation constant difference $\Delta \beta$ can be reduced to smaller than 1850 rad/m. That is, when FIGS. 4 and 5 are considered, if the diameter of the core is larger than 28 μm, the effective sectional area of the light in the LP01 mode can be increased to larger than 420 μm².

As illustrated in FIG. 7, it is seen that, for example, when the relative refractive index difference $\Delta n$ is 0.10, if the diameter of the core is 29.0 μm or smaller, the propagation constant difference $\Delta \beta$ can be increased to 1735 rad/m or larger. That is, when FIG. 6 is considered, if the diameter of the core is 29.0 μm or smaller, $M^2$ can be reduced to less than 0.05 and the deterioration in the beam quality of the light emitted from the optical fiber can be suppressed. Further, as illustrated in FIG. 7, it is seen that, if the diameter of the core is 28 μm or smaller, the propagation constant difference $\Delta \beta$ can be increased to 1850 rad/m or larger. That is, when FIG. 6 is considered, if the diameter of the core is 28 μm or smaller, $M^2$ can be reduced to less than 0.025 and the deterioration in the beam quality of the light emitted from the optical fiber can be further suppressed.

In this way, in the optical fiber that propagates the light having the wavelength of 1060 nm, if the propagation constant difference $\Delta \beta$ between the light in the LP01 mode and the light in the LP11 mode propagating in the optical fiber is 4000 rad/m or smaller, it is possible to suppress the stimulated Raman scattering from occurring. If the propagation constant difference $\Delta \beta$ is 2500 rad/m or smaller, it is possible to further suppress the stimulated Raman scattering from occurring. If the propagation constant difference $\Delta \beta$ is smaller than 1850 rad/m, that is, the diameter of the core is larger than 28 μm, it is possible to still further suppress the stimulated Raman scattering from occurring. On the other hand, if the propagation constant difference $\Delta \beta$ between the light in the LP01 mode and the light in the LP11 mode propagating in the optical fiber is 1735 rad/m or larger, the deterioration in the beam quality of the light emitted from the optical fiber is suppressed. If the propagation constant difference $\Delta \beta$ is 1850 rad/m or larger, the deterioration in the beam quality of the light emitted from the optical fiber is further suppressed.

Therefore, in the laser device 1 explained above, if the propagation constant difference $\Delta \beta$ between the light in the LP01 mode and the light in the LP11 mode propagating in the first optical fiber 30 and the second optical fiber 40 is 4000 rad/m or smaller, it is possible to suppress the stimulated Raman scattering from occurring. If the propagation constant difference $\Delta \beta$ is 2500 rad/m or smaller, it is possible to further suppress the stimulated Raman scattering from occurring. If the propagation constant difference $\Delta \beta$ is smaller than 1850 rad/m, it is possible to still further suppress the stimulated Raman scattering from occurring. On the other hand, if the propagation constant difference $\Delta \beta$ between the light in the LP01 mode and the light in the LP11 mode propagating in the first optical fiber 30 and the second optical fiber 40 is 1735 rad/m or larger, the deterioration in the beam quality of the light emitted from the laser device 1 is suppressed. If the propagation constant difference $\Delta \beta$ is 1850 rad/m or larger, the deterioration in the beam quality of the light emitted from the laser device 1 is further suppressed.

Next, a relation between a theoretical cutoff wavelength and a bending loss is explained. The theoretical cutoff wavelength is a wavelength at which an effective refractive index at a predetermined wavelength is calculated from a refractive index profile of the optical fiber and the calculated effective refractive index is equal to the refractive index of the clad. Note that the theoretical cutoff wavelength can be changed according to a refractive index difference between the core and the clad, the diameter of the core, a refractive index profile of the core, and the like.

A cutoff wavelength in a predetermined bending diameter and a shortest wavelength at which a bending loss occurs are generally proportional to the theoretical cutoff wavelength of the optical fiber. Examples of the optical fiber having such a proportional relation include an optical fiber in which a relative refractive index difference of the core with respect to the clad is 0.2% or less. These proportional constants can be calculated by, for example, preparing a plurality of optical fibers having different theoretical cutoff wavelengths, changing bending diameters of the individual optical fibers, and measuring, in the individual LP modes, shortest wavelengths at which a bending loss occurs and cutoff wavelengths.

In an optical fiber in which a relative refractive index difference of the core with respect to the clad is 0.2% or less, when a cutoff wavelength in a state in which the optical fiber is bent is measured, the cutoff wavelength decreases according to the inverse of a curvature radius of the optical fiber. When a bending diameter of the optical fiber is changed and a bending loss is measured, a shortest wavelength at which the bending loss occurs also decreases according to the inverse of the bending diameter of the optical fiber.

Figure 8:
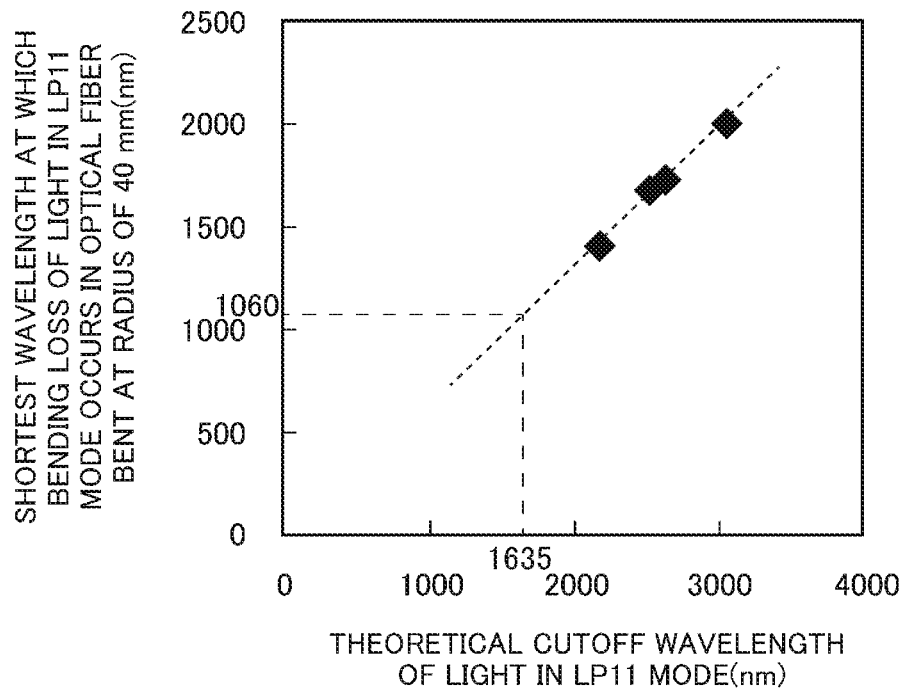
FIG. 8 is a diagram illustrating a relation between a theoretical cutoff wavelength of the light in the LP11 mode and a shortest wavelength at which a bending loss of the light in the LP11 mode occurs in the optical fiber bent at a curvature radius of 40 mm according to one or more embodiments of the present invention.

FIG. 8 is a diagram illustrating a relation between a theoretical cutoff wavelength of the light in the LP11 mode and a shortest wavelength at which a bending loss of the light in the LP11 mode in the optical fiber bent at a curvature radius of 40 mm occurs. Note that, in FIG. 8, in order to reduce the influence of a measurement error, a plurality of optical fibers are wound one round or more while changing a curvature radius from 30 mm to 50 mm, a shortest wavelength at which a bending loss of the light in the LP11 mode occurs is measured, a change in the shortest wavelength at which the bending loss of the light in the LP11 mode with respect to the inverse of the bending diameter occurs is linearly approximated, and a shortest wavelength at which a bending loss of the light in the LP11 mode at the curvature radius of 40 mm occurs is calculated again using the approximated straight line. The shortest wavelength at which the bending loss occurs is set to a wavelength at which the difference between a loss of light in the case in which the optical fiber is not bent and a loss of light in the case in which the optical fiber is bent is 0.1 dB or more. The cutoff wavelength is set to a wavelength at which the difference between the loss of light in the case in which the optical fiber is not bent and the loss of light in the case in which the optical fiber is bent is less than 0.1 dB.

From FIG. 8, in the optical fiber bent at the curvature radius of 40 mm, if the theoretical cutoff wavelength of the light in the LP11 mode is longer than 1635 nm, at least the light in the LP11 mode having the wavelength of 1060 nm can be propagated. Therefore, even the optical fiber bent at a curvature radius larger than the curvature radius of 40 mm can propagate the light in the LP11 mode having at least the wavelength of 1060 nm if the theoretical cutoff wavelength of the light in the LP11 mode is longer than 1635 nm. Incidentally, in the laser device 1 illustrated in FIG. 1, at least one of the amplification optical fiber 10, the first optical fiber 30, and the second optical fiber 40 is sometimes bent at a curvature radius equal to or larger than 40 mm and stored. In other laser devices and the like in which optical fibers are used, the optical fibers are sometimes bent and stored in this way. When the optical fiber is bent at the curvature radius equal to or larger than 40 mm in this way, as explained above, if the theoretical cutoff wavelength of the light in the LP11 mode is longer than 1635 nm, even when a part of the light in the LP01 mode shifts to the light in the LP11 mode, it is possible to stably propagate the light in the LP11 mode and suppress a loss of the light.

Figure 9:
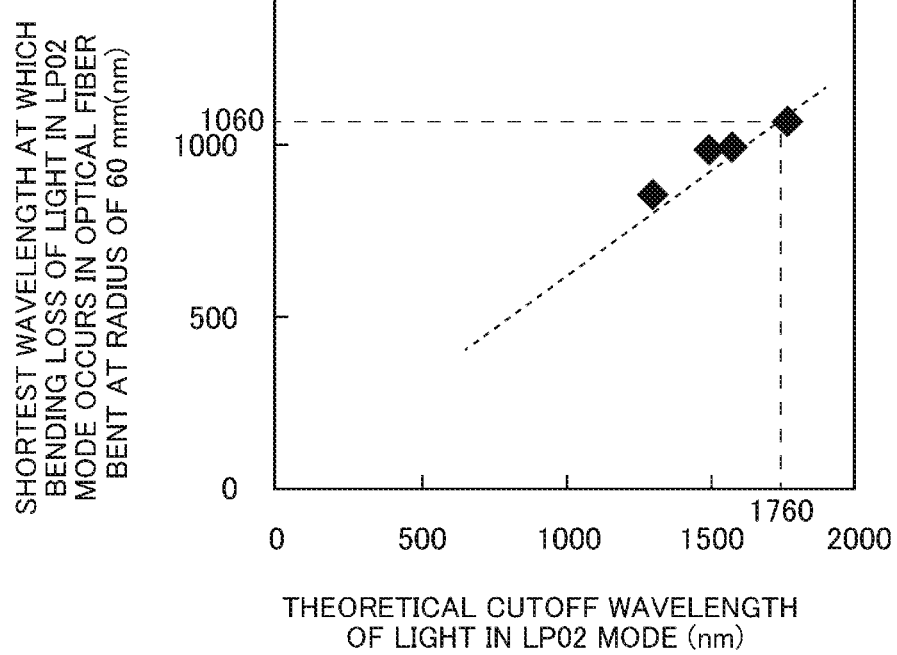
FIG. 9 is a diagram illustrating a theoretical cutoff wavelength of light in an LP02 mode and a shortest wavelength at which a bending loss of the light in the LP02 mode occurs in the optical fiber bent at a curvature radius of 60 mm according to one or more embodiments of the present invention.

FIG. 9 is a diagram illustrating a relation between the theoretical cutoff wavelength of the light in the LP02 mode and a shortest wavelength at which a bending loss of the light in the LP02 mode occurs in the optical fiber bent at the curvature radius of 60 mm. Note that, in FIG. 9, in order to reduce the influence of a measurement error, a plurality of optical fibers are wound one round or more while changing a curvature radius from 50 mm to 120 mm, a shortest wavelength at which a bending loss of the light in the LP02 mode occurs is measured, a change in the shortest wavelength at which the bending loss of the light in the LP02 mode with respect to the inverse of the bending diameter occurs is linearly approximated, and a shortest wavelength at which a bending loss of the light in the LP02 mode at the curvature radius of 60 mm occurs is calculated again using the approximated straight line. The shortest wavelength at which the bending loss occurs and the cutoff wavelength are the same as the shortest wavelength at which the bending loss occurs and the cutoff wavelength in FIG. 8.

From FIG. 9, in the optical fiber bent at the curvature radius of 60 mm, if the theoretical cutoff wavelength of the light in the LP02 mode is 1760 nm or less, it is possible to lose the light in the LP02 mode having at least the wavelength of 1060 nm. Therefore, even in the optical fiber bent at a curvature radius smaller than the curvature radius of 60 mm, if the theoretical cutoff wavelength of the light in the LP02 mode is 1760 nm or less, it is possible to lose the light in the LP02 mode having at least the wavelength of 1060 nm. Incidentally, in the laser device 1 illustrated in FIG. 1, at least one of the amplification optical fiber 10, the first optical fiber 30, and the second optical fiber 40 is sometimes bent at a curvature radius equal to or smaller than 60 mm and stored. In other laser devices and the like in which optical fibers are used, the optical fibers are sometimes bent at the curvature radius equal to or smaller than 60 mm and stored. When the optical fiber is bent at the curvature radius equal to or smaller than 60 mm in this way, as explained above, if the theoretical cutoff wavelength of the light in the LP02 mode is equal to or shorter than 1760 nm, even when a part of the light in the LP01 mode shifts to the light in the LP11 mode and further shifts to the LP02 mode, it is possible to lose the light in the LP02 mode. Therefore, it is possible to suppress deterioration in beam quality of emitted light. Note that, in this case, considering FIG. 8, if the theoretical cutoff wavelength of the light in the LP11 mode is longer than 1760 nm, it is possible to remove the light in the LP02 mode while propagating the light in the LP01 mode and the light in the LP11 mode.

Figure 10:
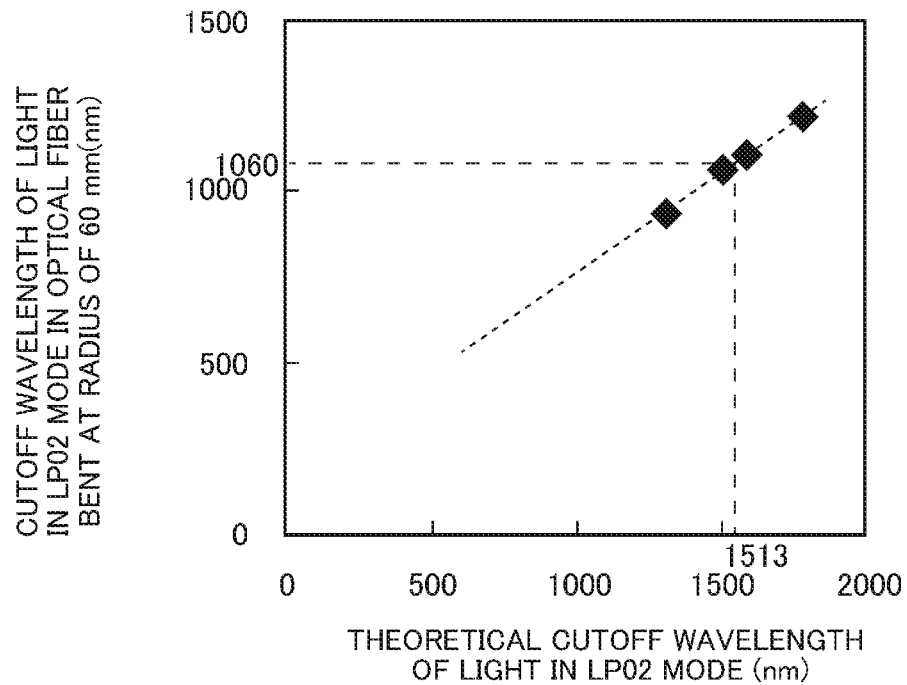
FIG. 10 is a diagram illustrating a relation between the theoretical cutoff wavelength of the light in the LP02 mode and a cutoff wavelength of the light in the LP02 mode in the optical fiber bent at the curvature radius of 60 mm according to one or more embodiments of the present invention.

FIG. 10 is a diagram illustrating a relation between the theoretical cutoff wavelength of the light in the LP02 mode and a cutoff wavelength of the light in the LP02 mode in the optical fiber bent at the curvature radius of 60 mm. Note that, in FIG. 10, in order to reduce the influence of a measurement error, a plurality of optical fibers are wound one round or more while changing a curvature radius from 50 mm to 120 mm, a cutoff wavelength of the light in the LP02 mode is measured, a change in the cutoff wavelength of the light in the LP02 mode with respect to the inverse of the bending diameter is linearly approximated, and a cutoff wavelength of the light in the LP02 mode at the curvature radius of 60 mm is calculated again using the approximated straight line. The cutoff wavelength is the same as the cutoff wavelength in FIG. 8.

From FIG. 10, in the optical fiber bent at the curvature radius of 60 mm, if the theoretical cutoff wavelength of the light in the LP02 mode is shorter than 1513 nm, the light in the LP02 mode having at least the wavelength of 1060 nm can be hardly propagated. Therefore, even in the optical fiber bent at the curvature radius smaller than the curvature radius of 60 mm, if the theoretical cutoff wavelength of the light in the LP02 mode is shorter than 1513 nm, it is possible to suppress most of the propagation of the light in the LP02 mode having at least the wavelength of 1060 nm. As explained above, in the laser device 1 illustrated in FIG. 1, at least one of the amplification optical fiber 10, the first optical fiber 30, and the second optical fiber 40 is sometimes bent at a curvature radius equal to or smaller than 60 mm and stored. In other laser devices and the like in which optical fibers are used, the optical fibers are sometimes bent at the curvature radius equal to or smaller than 60 mm and stored. When the optical fiber is bent at the curvature radius equal to or smaller than 60 mm in this way, as explained above, if the theoretical cutoff wavelength of the light in the LP02 mode is shorter than 1513 nm, even when a part of the light in the LP01 mode shifts to the light in the LP11 mode and further shifts to the light in the LP02 mode, when the light passes a portion bent at the curvature radius equal to or smaller than 60 mm of the optical fiber, since most of the light in the LP02 mode leaks from the core, the light in the LP02 mode can be removed.

Figure 11:
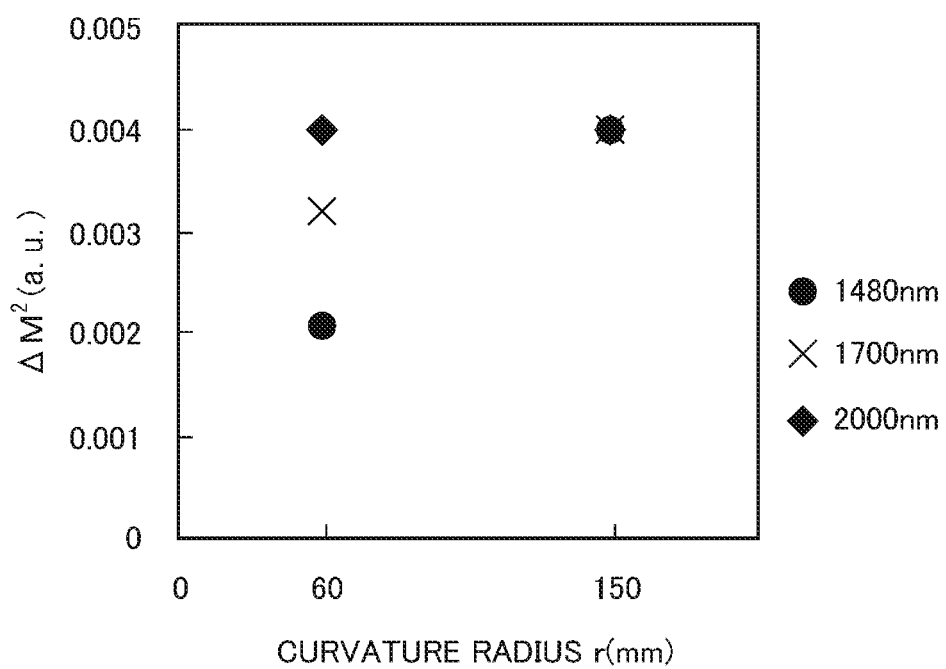
FIG. 11 is a diagram illustrating beam quality of emitted light in the case in which optical fibers, in which respective theoretical cutoff wavelengths of the light in the LP02 mode are 1480 nm, 1700 nm, and 2000 nm, are bent at a curvature radius of 150 mm and in the case in which the optical fibers are bent at the curvature radius of 60 mm according to one or more embodiments of the present invention.

FIG. 11 is a diagram illustrating beam quality of emitted light in the case in which optical fibers, in which respective theoretical cutoff wavelengths of the light in the LP02 mode are 1480 nm, 1700 nm, and 2000 nm, are bent at a curvature radius of 150 mm and in the case in which the optical fibers are bent at the curvature radius of 60 mm. Note that FIG. 11 is a diagram in which the light in the basic mode having the wavelength of 1060 nm is made incident from one end of the optical fiber and $M^2$ of the light emitted from the other end of the optical fiber is measured. In FIG. 11, the deterioration amount $\Delta M^2$ of beam quality due to propagation in the optical fiber, which is the difference between $M^2=1$ of the light in the basic mode made incident on the optical fiber and $M^2$ of emitted light, is plotted on the vertical axis.

As illustrated in FIG. 11, when the optical fiber is bent at the curvature radius of 60 mm, as a result, the optical fiber, the theoretical cutoff wavelength of which is 1700 nm shorter than the theoretical cutoff wavelength of 1760 nm, can emit light having more satisfactory beam quality than the optical fiber, the theoretical cutoff wavelength of which is 2000 nm longer than the theoretical cutoff wavelength of 1760 nm. This is considered to be because, in the optical fiber that is bent at the curvature radius of 60 mm and in which the theoretical cutoff wavelength of the light in the LP02 mode is equal to or shorter than 1760 nm, even if the incident light in the basic mode having the wavelength of 1060 nm shifts to the light in the LP02 mode, the light in the LP02 mode, to which the light in the basic mode shifts, is lost. As illustrated in FIG. 6, when the optical fiber is bent at the curvature radius of 60 mm, as a result, the optical fiber, the theoretical cutoff wavelength of which is 1480 nm shorter than the theoretical cutoff wavelength of 1513 nm, can emit light having still more satisfactory beam quality. This is considered to be because, in the optical fiber that is bent at the curvature radius of 60 mm and in which the theoretical cutoff wavelength is shorter than 1513 nm, even when the incident light in the basic mode having the wavelength of 1060 nm shifts to the light in the LP11 mode and further shifts to the light in the LP02 mode, the light in the LP02 mode is removed because most of the light in the LP02 mode leaks from the core. Note that, when the optical fiber is bent at the curvature radius of 150 mm, no difference is seen in the beam quality of the lights emitted from the individual optical fibers.

Figure 12:
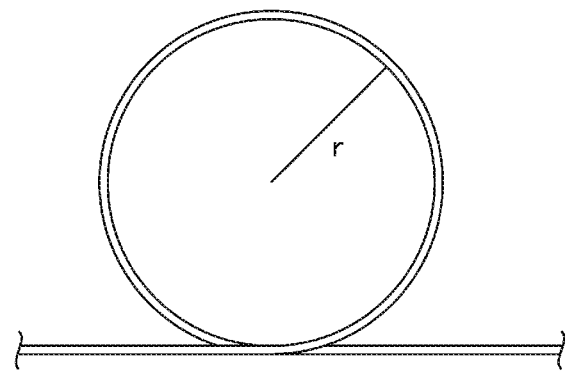
FIG. 12 is a diagram illustrating an example in which the optical fiber is bent at a curvature radius r according to one or more embodiments of the present invention.
Figure 13:
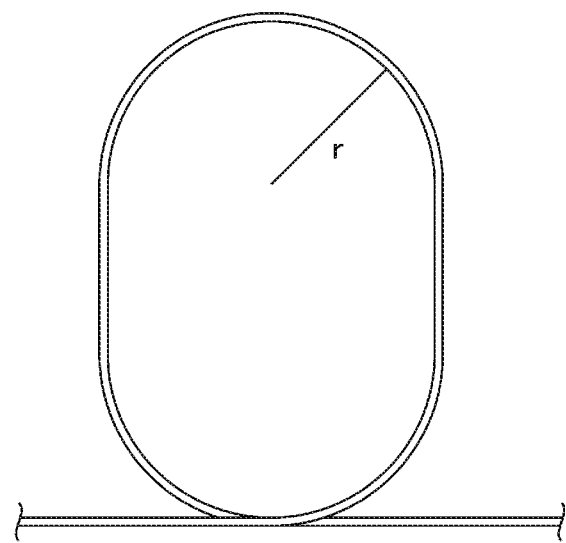
FIG. 13 is a diagram illustrating another example in which the optical fiber is bent at the curvature radius r according to one or more embodiments of the present invention.
Figure 14:
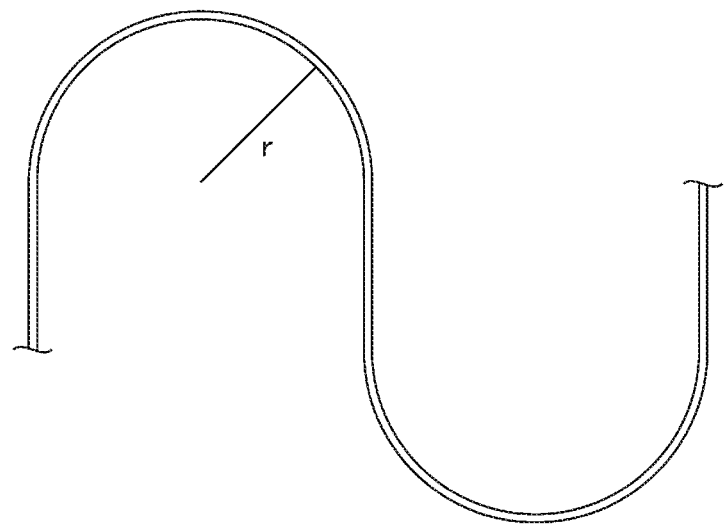
FIG. 14 is a diagram illustrating still another example in which the optical fiber is bent at the curvature radius r according to one or more embodiments of the present invention.

The optical fiber explained above can be bent, for example, as illustrated in FIG. 12 to FIG. 14, and stored in the laser device or the like. In an example illustrated in FIG. 12, the optical fiber is bent in a circular shape having the curvature radius r. In an example illustrated in FIG. 13, the optical fiber is bent in a race track shape including an arcuate portion having the curvature radius r. In an example illustrated in FIG. 14, the optical fiber is bent in an S shape including a curved portion having the curvature radius r. This curvature radius r is set to 40 mm and 60 mm as explained above. Note that, in one or more embodiments, the optical fiber is bent one round or more at the curvature radius r.

As explained above, at least one of the amplification optical fiber 10, the first optical fiber 30, and the second optical fiber 40 used in the laser device 1 in one or more embodiments is the optical fiber in which the light having at least the wavelength of 1060 nm is capable of propagating in the core at least in the LP01 mode and the LP11 mode. The difference between the propagation constant of the light in the LP01 mode and the propagation constant of the light in the LP11 mode is 1735 rad/m or larger and 4000 rad/m or smaller. Therefore, it is possible to suppress deterioration in beam quality while suppressing the stimulated Raman scattering.

In at least one of the amplification optical fiber 10, the first optical fiber 30, and the second optical fiber 40 used in the laser device 1 of one or more embodiments, if the difference between the propagation constant of the light in the LP01 mode and the propagation constant of the light in the LP11 mode is smaller than 1850 rad/m, it is possible to further increase the effective sectional area of the light in the LP01 mode and further suppress the stimulated Raman scattering.

In at least one of the amplification optical fiber 10, the first optical fiber 30, and the second optical fiber 40 used in the laser device 1 of one or more embodiments, if the theoretical cutoff wavelength of the light in the LP11 mode is longer than 1635 nm, when the optical fiber is bent at the curvature radius equal to or larger than 40 mm, it is possible to suppress a leak of the light in the LP11 mode having the wavelength of 1060 nm. Therefore, even when a part of the light in the LP01 mode shifts to the light in the LP11 mode, it is possible to stably propagate the light in the LP11 mode and suppress a loss of the light.

In at least one of the amplification optical fiber 10, the first optical fiber 30, and the second optical fiber 40 used in the laser device 1 of one or more embodiments, if the relative refractive index difference of the core with respect to the clad is 0.2% or less and the theoretical cutoff wavelength of the light in the LP02 mode is 1760 nm or less, when the optical fiber is bent at the curvature radius equal to or smaller than 60 mm, it is possible to lose the light in the LP02 mode having the wavelength of 1060 nm. Therefore, when the optical fiber is bent at the curvature radius equal to or smaller than 60 mm, even when a part of the light in the LP01 mode shifts to the light in the LP11 mode and further shifts to the light in the LP02 mode, it is possible to suppress deterioration in beam quality of emitted light by losing the light in the LP02 mode.

In at least one of the amplification optical fiber 10, the first optical fiber 30, and the second optical fiber 40 used in the laser device 1 of one or more embodiments, if the relative refractive index difference of the core with respect to the clad is 0.2% or less and the theoretical cutoff wavelength of the light in the LP02 mode is shorter than 1513 nm, when the optical fiber is bent at the curvature radius of 60 mm, most of the light in the LP02 mode having the wavelength of 1060 nm leaks from the core and most of the propagation of the light is suppressed. Therefore, even when the light in the LP11 mode shifts to the light in the LP02 mode, when the light passes a portion bent at the curvature radius equal to or smaller than 60 mm of the optical fiber, since most of the light in the LP02 mode leaks from the core, it is possible to remove the light in the LP02 mode. Therefore, after the light passes the portion bent at the curvature radius equal to or smaller than 60 mm of the optical fiber, light with suppressed deterioration in beam quality propagates. Accordingly, it is possible to suppress deterioration in beam quality of emitted light.

Next, embodiments of the present invention will be explained in detail below with reference to FIG. 15. Note that components same as or equivalent to the components in the above-described embodiments are denoted by the same reference numerals and signs and explanation of the components is omitted except when the components are particularly explained.

Figure 15:
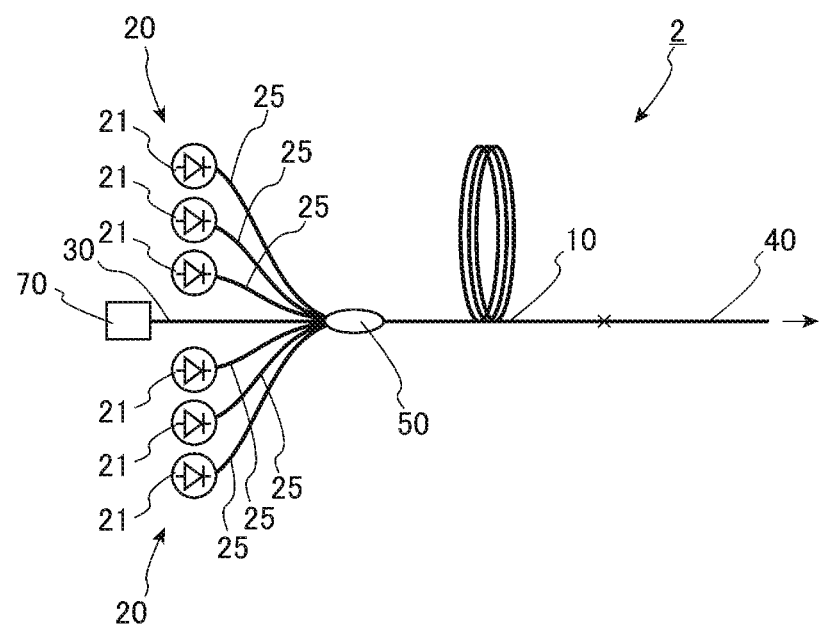
FIG. 15 is a diagram illustrating a laser device according to one or more embodiments of the present invention.

FIG. 15 is a diagram illustrating a laser device according to one or more embodiments. As illustrated in FIG. 15, a laser device 2 in one or more embodiments is different from the laser device 1 in the above-described embodiments in that the laser device 2 is a fiber laser device of an MO-PA (Master Oscillator Power Amplifier) type. Therefore, the laser device 2 in one or more embodiments includes a seed light source 70.

The seed light source 70 includes, for example, a laser diode or a fiber laser and is configured to emit seed light having a wavelength of 1060 nm. The seed light source 70 is configured the same as the first optical fiber 30 in the above-described embodiments and connected to the first optical fiber 30 in which an FBG is not formed. The seed light emitted from the seed light source 70 propagates in a core of the first optical fiber 30.

An optical combiner 50 in one or more embodiments is configured the same as the optical combiner 50 in the above-described embodiments. Therefore, the seed light emitted from the seed light source 70 is made incident on a core 31 of an amplification optical fiber 10 via the core of the first optical fiber 30 and propagates in the core 31. As in the laser device 1 in the above-described embodiments, pumping lights emitted from respective laser diodes 21 of a pumping light source 20 are made incident on an inner clad 12 of the amplification optical fiber 10, propagates mainly in the inner clad 12, and pumps ytterbium added to the core 11. Accordingly, the seed light propagating in the core is amplified by stimulated emission of ytterbium changed to a pumped state. The amplified seed light is emitted from the amplification optical fiber 10 as output light. The light emitted from the amplification optical fiber 10 is emitted via a second optical fiber 40 as in the above-described embodiments.

Additionally, in one or more embodiments, at least one of the amplification optical fiber 10, the first optical fiber 30, and the second optical fiber 40 used in the laser device 2 is an optical fiber in which light having at least the wavelength of 1060 nm is capable of propagating in the core at least in an LP01 mode and an LP11 mode. The difference between a propagation constant of light in the LP01 mode and a propagation constant of light in the LP11 mode is 1735 rad/m or larger and 4000 rad/m or smaller. Therefore, it is possible to suppress deterioration in beam quality while suppressing stimulated Raman scattering.

Additionally, in one or more embodiments, in at least one of the amplification optical fiber 10, the first optical fiber 30, and the second optical fiber 40 used in the laser device 2, if a theoretical cutoff wavelength of the light in the LP11 mode is longer than 1635 nm, when the optical fiber is bent at a curvature radius equal to or larger than 40 mm, it is possible to suppress a leak of the light in the LP11 mode having the wavelength of 1060 nm. In at least one of the amplification optical fiber 10, the first optical fiber 30, and the second optical fiber 40, if a relative refractive index difference of the core with respect to the clad is 0.2% or less and a theoretical cutoff wavelength of light in an LP02 mode is 1760 nm or less, when the optical fiber is bent at the curvature radius equal to or smaller than 60 mm, it is possible to lose the light in the LP02 mode having the wavelength of 1060 nm. In at least one of the amplification optical fiber 10, the first optical fiber 30, and the second optical fiber 40, if the relative refractive index difference of the core with respect to the clad is 0.2% or less and the theoretical cutoff wavelength of the light in the LP02 mode is shorter than 1513 nm, when the optical fiber is bent at the curvature radius equal to or smaller than 60 mm, most of the light in the LP02 mode having the wavelength of 1060 nm leaks from the core and propagation of the light in the LP02 mode having the wavelength of 1060 nm is suppressed in the core. Therefore, even when the light in the LP11 mode shifts to the light in the LP02 mode, since most of the light in the LP02 mode leaks from the core, the light in the LP02 mode is remove. It is possible to suppress deterioration in beam quality of emitted light.

Next, embodiments of the present invention will be explained in detail with reference to FIG. 16. Note that components same as or equivalent to the components in the above-described embodiments are denoted by the same reference numerals and signs and explanation of the components is omitted except when the components are particularly explained.

Figure 16:
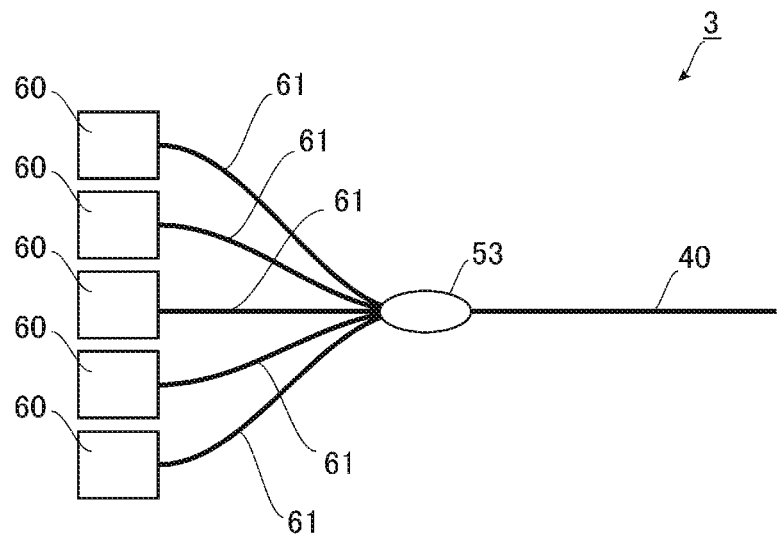
FIG. 16 is a diagram illustrating a laser device according to one or more embodiments of the present invention.

FIG. 16 is a diagram illustrating a laser device according to one or more embodiments. As illustrated in FIG. 16, a laser device 3 in one or more embodiments includes, as main components, a plurality of light sources 60, an optical combiner 53, and a second optical fiber 40 same as the second optical fiber in the above-described embodiments.

The light sources 60 are each configured as a laser device that emits light having a wavelength of 1060 nm and configured as, for example, a fiber laser device or a solid-state laser device. When the light source 60 is configured as the fiber laser device, the light source 60 is configured as a fiber laser device of a resonator type same as the fiber laser device in the above-described embodiments or configured as a fiber laser device of an MO-PA type same as the fiber laser device in the above-described embodiments.

Optical fibers 61, which propagate the lights emitted from the light sources 60, are connected to the respective light sources 60. The optical fibers 61 are each the same as, for example, the first optical fiber 30 in the above-described embodiments. Therefore, the lights emitted from the light sources 60 propagate in the respective optical fibers 61 in a few modes.

The optical combiner 53 optically connects cores of the individual optical fibers 61 and a core of the second optical fiber 40.

In the laser device 3 of one or more embodiments, the lights having the wavelength of 1060 nm are emitted from the respective light sources 60. The lights are made incident on the core of the second optical fiber 40 via the respective optical fibers 61 and via the optical combiner 53. The lights are emitted from the second optical fiber 40.

Additionally, in one or more embodiments, in the second optical fiber 40 used in the laser device 3, the light having at least the wavelength of 1060 nm is capable of propagating in the core at least in an LP01 mode and an LP11 mode. The difference between a propagation constant of light in the LP01 mode and a propagation constant of light in the LP11 mode is 1735 rad/m or larger and 4000 rad/m or less. Therefore, it is possible to suppress deterioration in beam quality while suppressing stimulated Raman scattering.

Additionally, in one or more embodiments, in the second optical fiber 40 used in the laser device 3, if a theoretical cutoff wavelength of the light in the LP11 mode is longer than 1635 nm, when the optical fiber is bent at a curvature radius equal to or larger than 40 mm, it is possible to suppress a leak of the light in the LP11 mode having the wavelength of 1060 nm. In the second optical fiber 40, if a relative refractive index difference of the core with respect to a clad is 0.2% or less and a theoretical cutoff wavelength of light in an LP02 mode is 1760 nm or less, when the optical fiber is bent at a curvature radius equal to or smaller than 60 mm, it is possible to lose the light in the LP02 mode having the wavelength of 1060 nm. In the second optical fiber 40, if the relative refractive index difference of the core with respect to the clad is 0.2% or less and the theoretical cutoff wavelength of the light in the LP02 mode is shorter than 1513 nm, when the optical fiber is bent at the curvature radius equal to or smaller than 60 mm, most of the light in the LP02 mode having the wavelength of 1060 nm leaks from the core. Propagation of the light in the LP02 mode having the wavelength of 1060 nm is suppressed in the core. Therefore, even when the light in the LP11 mode shifts to the light in the LP02 mode, since most of the light in the LP02 mode leaks from the core, the light in the LP02 mode is remove. It is possible to suppress deterioration in beam quality of emitted light.

The present invention is explained above using the above-described embodiments as examples. However, the present invention is not limited to the embodiments. The configurations can be changed as appropriate. Note that, in the optical fibers in the embodiments, the light having at least the wavelength of 1060 nm is capable of propagating in the core in the LP01 mode and the LP11 mode. The difference between the propagation constant of the light in the LP01 mode and the propagation constant of the light in the LP11 mode only has to be 1735 rad/m or larger and 4000 rad/m or smaller. The other configurations can be changed as appropriate.

In this way, in the embodiments explained above, the optical fiber in which the light having at least the wavelengths of 1060 nm is capable of propagating in the core at least in the LP01 mode and the LP11 mode is explained as an example. Incidentally, the explanation referring to FIG. 8 to FIG. 10 holds generally irrespective of the wavelength of light if the wavelength is equal to or longer than 1000 nm and equal to or shorter than 1100 nm. In the explanation referring to FIG. 6, in the light having the wavelength of 1000 nm to 1100 nm, the graph hardly changes even when the wavelength is changed and shows generally the same tendency at any wavelength in the range.

Figure 17:
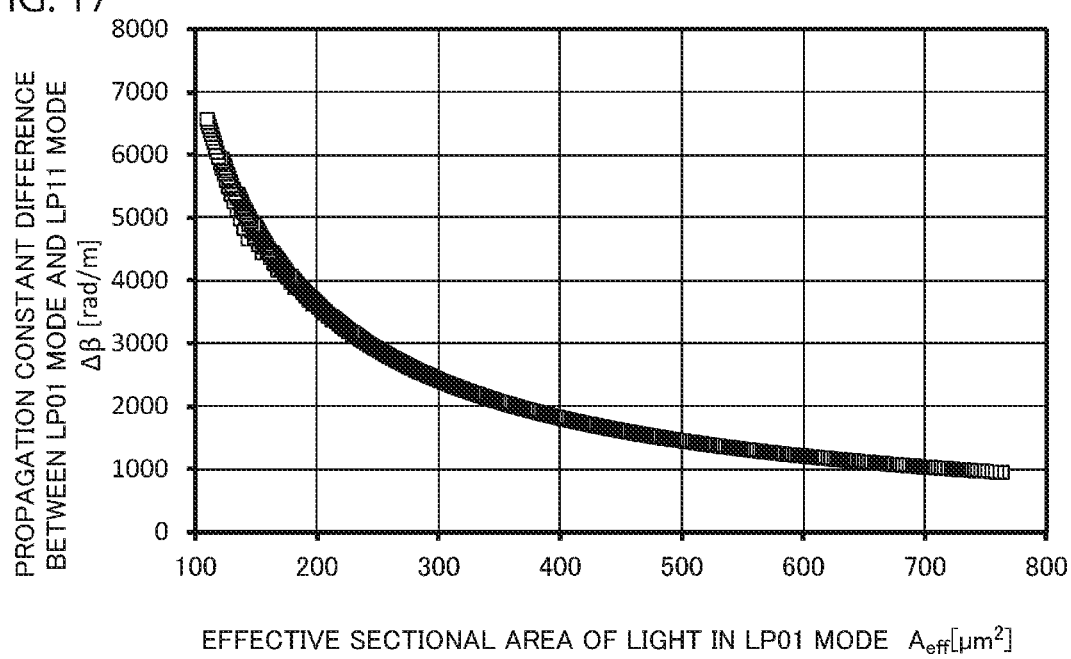
FIG. 17 is a simulation diagram illustrating a relation between an effective sectional area of light in the LP01 mode having a wavelength of 1000 nm propagating in an optical fiber and a difference between a propagation constant of the light in the LP01 mode and a propagation constant of light in an LP11 mode according to one or more embodiments of the present invention.

The light having the wavelength of 1060 nm is explained with reference to FIG. 4 and FIG. 5. However, even in the light having the wavelength of 1000 nm, it is possible to suppress the stimulated Raman scattering from occurring. FIG. 17 is a simulation diagram illustrating a relation between the effective sectional area of the light in the LP01 mode having the wavelength of 1000 nm propagating in the optical fiber and the difference between the propagation constant of the light in the LP01 mode and the propagation constant of the light in the LP11 mode. As illustrated in FIG. 17, even in the case of the light having the wavelength of 1000 nm at which the effective sectional area of the light in the LP01 mode is smaller than the effective sectional area of the light having the wavelength of 1060 nm, if the propagation constant difference $\Delta\beta$ between the light in the LP01 mode and the light in the LP11 mode is 4000 rad/m or smaller, the effective sectional area of the light in the LP01 mode can be increased to 180 $\mu m^2$ or larger. If the effective sectional area of the light in the LP01 mode is 180 $\mu m^2$ or larger, it is possible to reduce energy density of the light and suppress the stimulated Raman scattering from occurring. Even in the case in which the wavelength is 1000 nm, if the propagation constant difference $\Delta\beta$ is 2500 rad/m or smaller, the effective sectional area of the light in the LP01 mode can be increased to 290 $\mu m^2$ or larger. If the effective sectional area of the light in the LP01 mode is 290 $\mu m^2$ or larger, it is possible to further reduce the energy density of the light and further suppress the stimulated Raman scattering from occurring. Even in the case in which the wavelength is 1000 nm, if the propagation constant difference $\Delta\beta$ is smaller than 1850 rad/m, the effective sectional area of the light in the LP01 mode can be increased to larger than 400 $\mu m^2$. If the effective sectional area of the light in the LP01 mode is larger than 400 $\mu m^2$, it is possible to further reduce the energy density of the light and further suppress the stimulated Raman scattering from occurring. Note that, in the case in which the wavelength is longer than 1060 nm, it is possible to further increase the effective sectional area of the light in the LP01 mode illustrated in FIGS. 4 and 5 and further suppress the stimulated Raman scattering from occurring.

Figure 18:
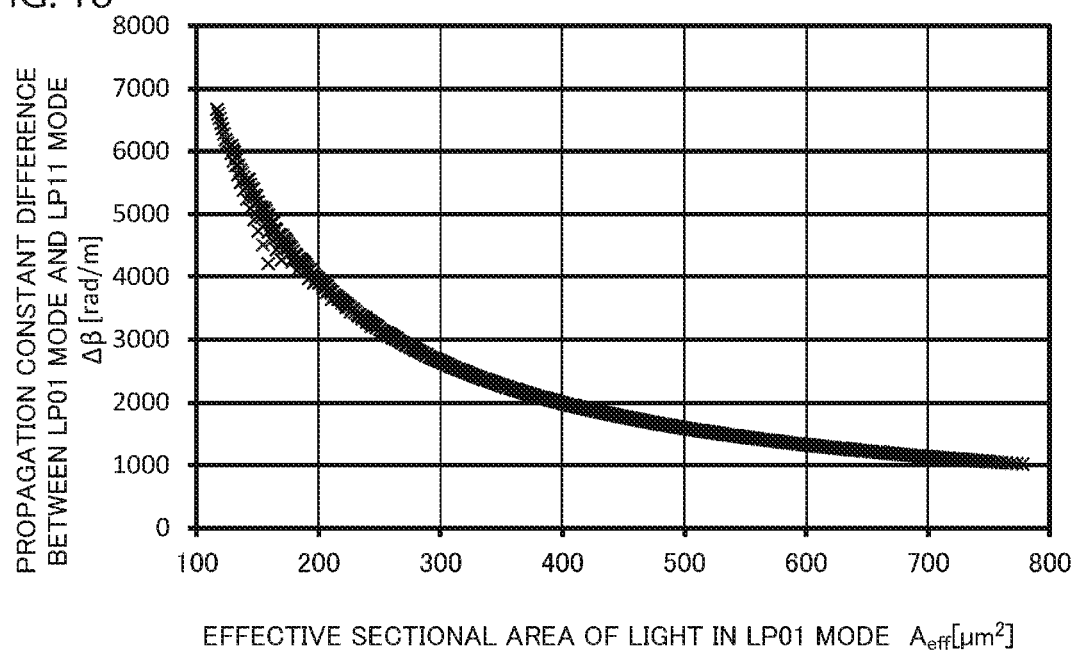
FIG. 18 is a simulation diagram illustrating a relation between an effective sectional area of light in the LP01 mode having a wavelength of 1100 nm propagating in the optical fiber and a difference between the propagation constant of the light in the LP01 mode and the propagation constant of the light in the LP11 mode according to one or more embodiments of the present invention.

FIG. 18 is a simulation diagram illustrating a relation between the effective sectional area of the light in the LP01 mode having the wavelength of 1100 nm propagating in the optical fiber and the difference between the propagation constant of the light in the LP01 mode and the propagation constant of the light in the LP11 mode. As illustrated in FIG. 18, in the light having the wavelength of 1100 nm longer than the wavelength of the light having the wavelength of 1060 nm, the effective sectional area of the light in the LP01 mode can be increased. Therefore, it is possible to suppress the stimulated Raman scattering from occurring. Specifically, as illustrated in FIG. 18, even in the case of the light having the wavelength of 1100 nm at which the effective sectional area of the light in the LP01 mode is smaller than in the light having the wavelength of 1060 nm, if the propagation constant difference $\Delta\beta$ between the light in the LP01 mode and the light in the LP11 mode is 4000 rad/m or smaller, the effective sectional area of the light in the LP01 mode can be increased to 205 $\mu m^2$ or larger. If the effective sectional area of the light in the LP01 mode is 205 $\mu m^2$ or larger, it is possible to reduce the energy density of the light and suppress the stimulated Raman scattering from occurring. Even in the case in which the wavelength is 1100 nm, if the propagation constant difference $\Delta\beta$ is 2500 rad/m or smaller, the effective sectional area of the light in the LP01 mode can be increased to 320 $\mu m^2$ or larger. If the effective sectional area of the light in the LP01 mode is 320 $\mu m^2$ or larger, it is possible to further reduce the energy density of the light and further suppress the stimulated Raman scattering from occurring. Even in the case in which the wavelength is 1100 nm, if the propagation constant difference $\Delta\beta$ is smaller than 1850 rad/m, the effective sectional area of the light in the LP01 mode can be increased to larger than 433 $\mu m^2$. If the effective sectional area of the light in the LP01 mode is larger than 433 $\mu m^2$, it is possible to further reduce the energy density of the light and further suppress the stimulated Raman scattering from occurring.

For example, in the amplification optical fiber 10, when ytterbium (Yb) is used as an active element, since the fluorescent wavelength of ytterbium is 1000 to 1100 nm, when at least the light in the LP01 mode and the light in the LP11 mode are capable of propagating in the core, if the wavelength of the lights is 1000 nm to 1100 nm, the lights can be amplified to relatively high power. Light having high power can be emitted. In one or more embodiments, ytterbium is added to a core of an optical fiber other than the amplification optical fiber 10 illustrated in FIG. 1 because light can be amplified to high power in the optical fiber added with ytterbium.

When the wavelength of light is longer than 1060 nm, as it is evident from the explanation referring to FIG. 18, it is possible to further increase the effective sectional area of the light in the LP01 mode and further suppress the stimulated Raman scattering from occurring. When the wavelength of light is longer than 1060 nm, since the propagation constant difference $\Delta\beta$ between the light in the LP01 mode and the light in the LP11 mode increases, when the effective sectional area of the light in the LP01 mode having the wavelength longer than the 1060 nm is the same as the effective sectional area of the light in the LP01 mode having the wavelength of 1060 nm, the deterioration amount $\Delta M^2$ of the beam quality can be reduced to smaller than that illustrated in FIG. 6.

In view of the above, the optical fiber according to one or more embodiments of the present invention may be an optical fiber in which light having at least a part of the wavelength equal to or longer than 1000 nm and equal to or shorter than 1100 nm is capable of propagating in the core at least in the LP01 mode and the LP11 mode and the difference between the propagation constant of the light in the LP01 mode and the propagation constant of the light in the LP11 mode is 1735 rad/m or larger and 4000 rad/m or smaller.

Examples of a part of such a wavelength equal to or longer than 1000 nm and equal to or shorter than 1100 nm include 1030 nm to 1090 nm, 1030 to 1087 nm, 1030 nm to 1081 nm, 1030 nm to 1080 nm, 1030 nm to 1070 nm, 1030 nm to 1060 nm, 1050 nm to 1093 nm, 1050 nm to 1090 nm, 1050 nm to 1087 nm, 1050 nm to 1081 nm, 1050 nm to 1080 nm, 1050 nm to 1070 nm, 1050 nm to 1060 nm, 1060 nm to 1093 nm, 1060 nm to 1090 nm, 1060 nm to 1087 nm, 1060 nm to 1081 nm, 1060 nm to 1080 nm, 1060 nm to 1070 nm, 1070 nm to 1093 nm, 1070 nm to 1090 nm, 1070 nm to 1087 nm, 1070 nm to 1081 nm, 1070 nm to 1080 nm, 1080 nm to 1093 nm, 1080 nm to 1090 nm, 1080 nm to 1087 nm, 1080 nm to 1081 nm, 1081 nm to 1093 nm, 1081 nm to 1090 nm, 1081 nm to 1087 nm, 1087 nm to 1093 nm, 1087 nm to 1090 nm, and 1090 nm to 1093 nm.

As it is evident from FIG. 11, it is seen that light having more satisfactory beam quality can be emitted as the theoretical cutoff wavelength in the LP02 mode is shorter. Therefore, in order to further improve the beam quality, when the light propagating in the optical fiber has, for example, the wavelength of 1000 nm, the theoretical cutoff wavelength in the LP02 mode may be 1327 nm to 1520 nm. However, the theoretical cutoff wavelength in the LP02 mode may be shorter than 1327 nm. When the light propagating in the optical fiber has, for example, the wavelength of 1030 nm, the theoretical cutoff wavelength in the LP02 mode may be 1420 nm to 1640 nm. However, theoretical cutoff wavelength in the LP02 mode may be shorter than 1420 nm. When the light propagating in the optical fiber has, for example, the wavelength of 1060 nm, the theoretical cutoff wavelength in the LP02 mode may be 1513 nm to 1760 nm. However, the theoretical cutoff wavelength in the LP02 mode may be shorter than 1513 nm. When the light propagating in the optical fiber has, for example, the wavelength of 1080 nm, the theoretical cutoff wavelength in the LP02 mode may be 1546 nm to 1804 nm. However, the theoretical cutoff wavelength in the LP02 mode may be shorter than 1546 nm. When the light propagating in the optical fiber has, for example, the wavelength of 1093 nm, the theoretical cutoff wavelength in the LP02 mode may be 1568 nm to 1834 nm. However, the theoretical cutoff wavelength in the LP02 mode may be shorter than 1568 nm. When the light propagating in the optical fiber has, for example, the wavelength of 1100 nm, the theoretical cutoff wavelength in the LP02 mode may be 1579 nm to 1850 nm. However, the theoretical cutoff wavelength in the LP02 mode may be shorter than 1597 nm.

The optical fiber according to one or more embodiments of the present invention may be used in the laser device as explained above but may be used in a device other than the laser device such as an optical amplifier.

As explained above, according to one or more embodiments of the present invention, the optical fiber and the laser device that can suppress deterioration in beam quality while suppressing stimulated Raman scattering are provided. Use in a laser device and the like for machining is expected.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1, 2, 3 . . . laser device
10 . . . amplification optical fiber
20 . . . pumping light source
30 . . . first optical fiber
31 . . . core
35 . . . first FBG
40 . . . second optical fiber
45 . . . second FBG
60 . . . light source
70 . . . seed light source

The invention claimed is:

1. An optical fiber comprising:
a core that propagates a light that includes a wavelength equal to or larger than 1000 nm and equal to or smaller than 1100 nm, wherein
the light propagates in the core at least in an LP01 mode and an LP11 mode,
a difference between a propagation constant of the light in the LP01 mode and a propagation constant of the light in the LP11 mode is 1735 rad/m or larger and 3000 rad/m or smaller,
a diameter of the core is 20 μm or larger and 29 μm or smaller, and
a relative refractive index difference of the core with respect to a clad is 0.1% or larger and 0.2% or smaller.

2. The optical fiber according to claim 1, wherein
the light includes a wavelength of 1060 nm that propagates in the core at least in the LP01 mode and the LP11 mode.

3. The optical fiber according to claim 1, wherein
the difference between the propagation constant of the light in the LP01 mode and the propagation constant of the light in the LP11 mode is smaller than 1850 rad/m.

4. The optical fiber according to claim 1, wherein
a theoretical cutoff wavelength of the light in the LP11 mode is longer than 1635 nm.

5. The optical fiber according to claim 1, wherein
a theoretical cutoff wavelength of light in an LP02 mode is 1760 nm or shorter.

6. The optical fiber according to claim 5, wherein
the theoretical cutoff wavelength of the light in the LP11 mode is longer than 1760 nm.

7. The optical fiber according to claim 1, wherein
a theoretical cutoff wavelength of the light in an LP02 mode is shorter than 1513 nm.

8. The optical fiber according to claim 1, wherein
ytterbium is added to the core.

9. A laser device comprising
the optical fiber according to claim 1.

10. The optical fiber according to claim 1, wherein
the core has a stepwise refractive index profile.

11. An optical fiber comprising:
a core that propagates a light that includes a wavelength equal to or larger than 1000 nm and equal to or smaller than 1100 nm, wherein the light propagates in the core at least in an LP01 mode and an LP11 mode, a difference between a propagation constant of the light in the LP01 mode and a propagation constant of the light in the LP11 mode is larger than 1750 rad/m and smaller than 1850 rad/m.

12. An optical fiber comprising:

a core that propagates a light that includes a wavelength equal to or larger than 1000 nm and equal to or smaller than 1100 nm, wherein the light propagates in the core at least in an LP01 mode and an LP11 mode, a difference between a propagation constant of the light in the LP01 mode and a propagation constant of the light in the LP11 mode is 1735 rad/m or larger and 4000 rad/m or smaller, a theoretical cutoff wavelength of the light in the LP11 mode is longer than 1635 nm.

13. The optical fiber according to claim 12, wherein the theoretical cutoff wavelength of the light in the LP11 mode is longer than 1760 nm.

14. The optical fiber according to claim 12, wherein a theoretical cutoff wavelength of the light in an LP02 mode is shorter than 1513 nm.

15. A laser device comprising:
the optical fiber according to claim 12.

16. An optical fiber comprising:

a core that propagates a light that includes a wavelength equal to or larger than 1000 nm and equal to or smaller than 1100 nm, wherein the light propagates in the core at least in an LP01 mode and an LP11 mode, a difference between a propagation constant of the light in the LP01 mode and a propagation constant of the light in the LP11 mode is 1735 rad/m or larger and 4000 rad/m or smaller, a theoretical cutoff wavelength of the light in an LP02 mode is 1760 nm or shorter.

17. The optical fiber according to claim 16, wherein a theoretical cutoff wavelength of the light in the LP11 mode is longer than 1635 nm.

18. The optical fiber according to claim 16, wherein the theoretical cutoff wavelength of the light in the LP11 mode is longer than 1760 nm.

19. The optical fiber according to claim 16, wherein a theoretical cutoff wavelength of the light in an LP02 mode is shorter than 1513 nm.

20. A laser device comprising:
the optical fiber according to claim 16.

* * * * *